United States Patent
Fushimi et al.

(10) Patent No.: US 8,121,004 B2
(45) Date of Patent: Feb. 21, 2012

(54) METHOD FOR ADJUSTING RECORDING POWER AND OPTICAL DISK APPARATUS

(75) Inventors: Tetsuya Fushimi, Tokyo (JP); Atsushi Yamada, Saitama (JP); Jinya Ikeda, Kasama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 249 days.

(21) Appl. No.: 12/464,136

(22) Filed: May 12, 2009

(65) Prior Publication Data

US 2010/0034066 A1 Feb. 11, 2010

(30) Foreign Application Priority Data

Aug. 8, 2008 (JP) .................................. 2008-206380

(51) Int. Cl.
*G11B 7/00* (2006.01)
(52) U.S. Cl. .................................................... 369/47.53
(58) Field of Classification Search .................. 369/116, 369/47.1, 47.52, 47.53, 47.27, 120, 121, 369/47.51
See application file for complete search history.

(56) References Cited

U.S. PATENT DOCUMENTS

| | | | | |
|---|---|---|---|---|
| 6,678,220 B1 * | 1/2004 | Saga | .......................... | 369/44.27 |
| 7,697,385 B2 * | 4/2010 | Ueki | .......................... | 369/47.53 |
| 7,787,335 B2 * | 8/2010 | Sasaki et al. | ................ | 369/47.53 |
| 2002/0141308 A1 | 10/2002 | Matsumoto | | |
| 2004/0011945 A1 | 1/2004 | Yokoi | | |
| 2005/0030861 A1 * | 2/2005 | Matsui et al. | ............... | 369/47.53 |
| 2005/0169139 A1 | 8/2005 | Kakimoto et al. | | |
| 2006/0007819 A1 | 1/2006 | Nakajo | | |
| 2007/0091751 A1 | 4/2007 | Ono | | |
| 2008/0068949 A1 | 3/2008 | Nakatani | | |
| 2008/0219116 A1 * | 9/2008 | Narumi | ....................... | 369/47.53 |

FOREIGN PATENT DOCUMENTS

| | | |
|---|---|---|
| JP | 06-259772 | 9/1994 |
| JP | 11-066562 | 3/1999 |
| JP | 2005-182886 | 7/2005 |
| JP | 2006-040328 | 2/2006 |

* cited by examiner

*Primary Examiner* — Nabil Z Hindi

(74) *Attorney, Agent, or Firm* — Antonelli, Terry, Stout & Kraus, LLP.

(57) ABSTRACT

A method for adjusting recording power of an optical disk apparatus having an output circuit that outputs recording light onto a test writing area of an optical disk, and a control circuit that adjusts the recording power of the recording light outputted from the output circuit, the method including the steps of causing the control circuit to erase a recording mark recorded onto the test writing area, to record a recording mark onto the test writing area in constant recording power lower than threshold power for starting a recording operation, and to record a recording mark onto the test writing area while changing the recording power.

20 Claims, 16 Drawing Sheets

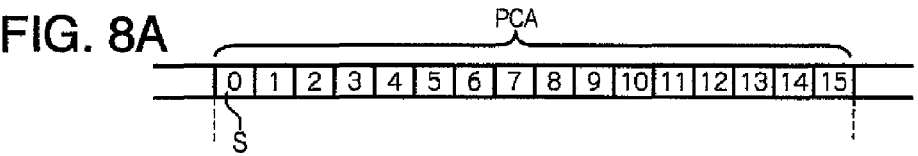
FIG. 8A
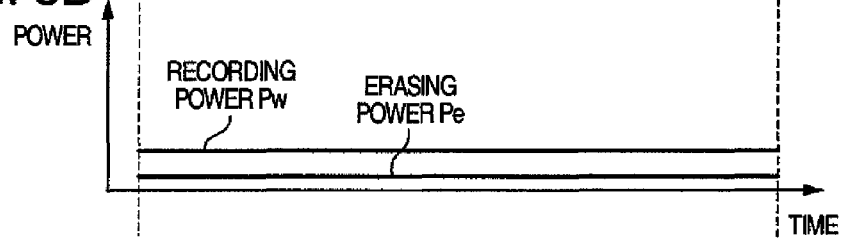
FIG. 8B
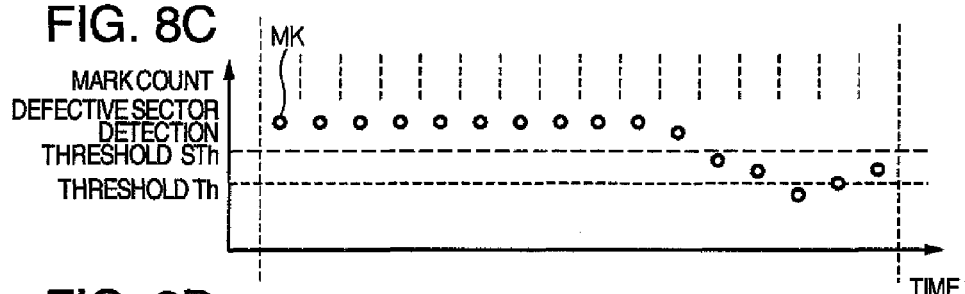
FIG. 8C
FIG. 8D
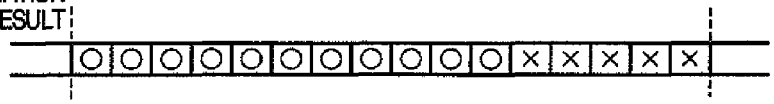
FIG. 8E
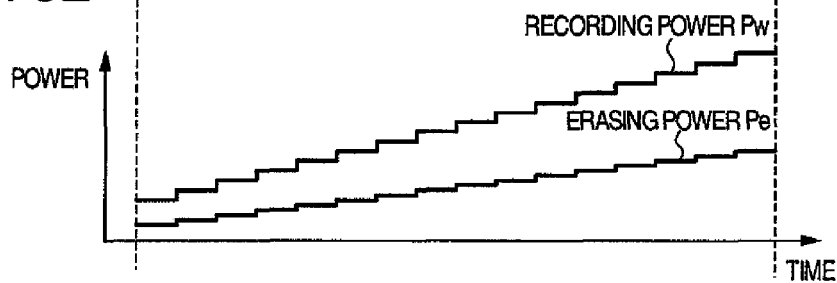
FIG. 8F
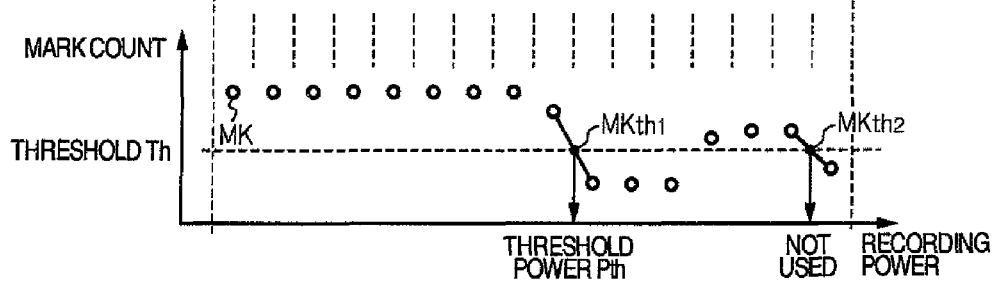

METHOD FOR ADJUSTING RECORDING POWER AND OPTICAL DISK APPARATUS

INCORPORATION BY REFERENCE

The present application claims priority from Japanese application JP2008-206380 filed on Aug. 8, 2008, the content of which is hereby incorporated by reference into this application.

BACKGROUND OF THE INVENTION

The present invention relates to a method for adjusting recording power and an optical disk apparatus, and is applied to the optical disk apparatus that records and reproduces data onto a re-writable optical disk (CD-RW, DVD-RAM, DVD+RW, DVD-RW, and BD-RE).

Onto each recordable optical disk, recorded is information as to in what recording waveform and in how much laser recording power a recording operation should be performed. However, owing to the following causes, even if a recording operation is performed onto the optical disk in the recorded waveform and recording power, recording results are not actually good in some cases. Specifically, the causes include a difference of a laser beam between a machine used for measurements in a media maker and an actual recording apparatus or a disk drive, and a difference of the speed in the rise and fall rate of the recording waveform.

For the above-described purpose, an area such as a power calibration area (PCA) or Drive Test Area (DTA) is prepared in the optical disk. The optical disk apparatus forms recording marks on this area and performs a test write operation. Thereby, the optical disk apparatus corrects a recording waveform and recording power during the recording operation and performs a processing capable of the recording under conditions perfect for the optical disk (hereinafter, referred to as an optimum power control (OPC)).

In JP-A-2005-182886, disclosed is a technology in which a test write operation is performed while avoiding an area having a degraded or defective recording layer in a test writing area.

In U.S. publication No. 2002/0141308, disclosed is a technology in which based on recording speed versus optimum recording power characteristics, quality of reproduction signals obtained by the reproduction of data written in trial is measured, and also the maximum recordable speed is obtained.

In U.S. publication No. 2005-003086, disclosed is a technology in which an erasing process is performed for a test writing area by using a laser beam of high power density, and as a result of the test write operation, a stable test writing is obtained regardless of a state of the test writing area.

SUMMARY OF THE INVENTION

An optical disk apparatus erases a recording mark recorded onto a test writing area to identify recording power by which the forming of the recording mark is started from a not-yet-recorded state. However, there occurs a problem that since a width in the radius direction of the recording mark is larger than a size of an area to be erased, the recording mark is not completely erased and left behind. Also, there occurs another problem that since characteristics of a recording layer of an optical disk are extremely changed owing to a recording operation using high recording power, the recording mark is prevented from being erased.

In view of the foregoing, it is an object of the present invention to provide a method for adjusting recording power and optical disk apparatus in which in a test writing process for a rewritable optical disk, when an area where the recording mark cannot be erased is excluded to adjust the recording power, the test writing process having high stability and high accuracy is realized.

To accomplish the above objects, according to one aspect of the present invention, provided is a method for adjusting recording power of an optical disk apparatus. The method for adjusting recording power of the optical disk apparatus comprising an output circuit that outputs recording light onto a test writing area of an optical disk, and a control circuit that adjusts recording power of the recording light outputted from the output circuit, the method includes the steps of causing the control circuit:

to erase a recording mark recorded onto the test writing area;

to record a recording mark onto the test writing area in constant recording power lower than threshold power for starting a recording operation; and to record a recording mark onto the test writing area while changing the recording power.

To accomplish the above objects, according to another aspect of the present invention, provided is an optical disk apparatus. The optical disk apparatus comprises:

an output circuit that outputs recording light onto a test writing area of an optical disk; and a control circuit that adjusts recording power of the recording light outputted from the output circuit, wherein:

the control circuit controls the recording power so as to record a recording mark onto the test writing area in constant recording power lower than threshold power for starting a recording operation between an erasing process for erasing the recording mark recorded onto the test writing area and a recording process for recording the recording mark onto the test writing area while changing the recording power.

According to the present embodiment, an area in which characteristics corresponding to the recording power are not obtained due to a recording mark that is left behind is excluded to adjust the recording power in the test writing process onto a rewritable optical disk. Thereby, the test writing process having high stability and high accuracy can be realized.

Other objects, features and advantages of the invention will become apparent from the following description of the embodiments of the invention taken in conjunction with the accompanying drawings.

BRIEF DESCRIPTION OF THE DRAWINGS

FIG. 8A is a schematic diagram illustrating a test writing area at the time of describing a mark counting method, FIG. 8B is a schematic diagram for performing an erasing process in constant low power at the time of describing a mark counting method, FIG. 8C is a schematic diagram illustrating a mark count, FIG. 8D is a schematic diagram illustrating a determination result at the time of describing a mark counting method, FIG. 8E is a schematic diagram illustrating a recording process at the time of describing a mark counting method, and FIG. 8F is a schematic diagram illustrating a mark count;

DESCRIPTION OF THE EMBODIMENTS

Hereinafter, one embodiment according to the present invention will be described with reference to the accompanying drawings.

(1) Configuration of Optical Disk Apparatus

Figure 1:
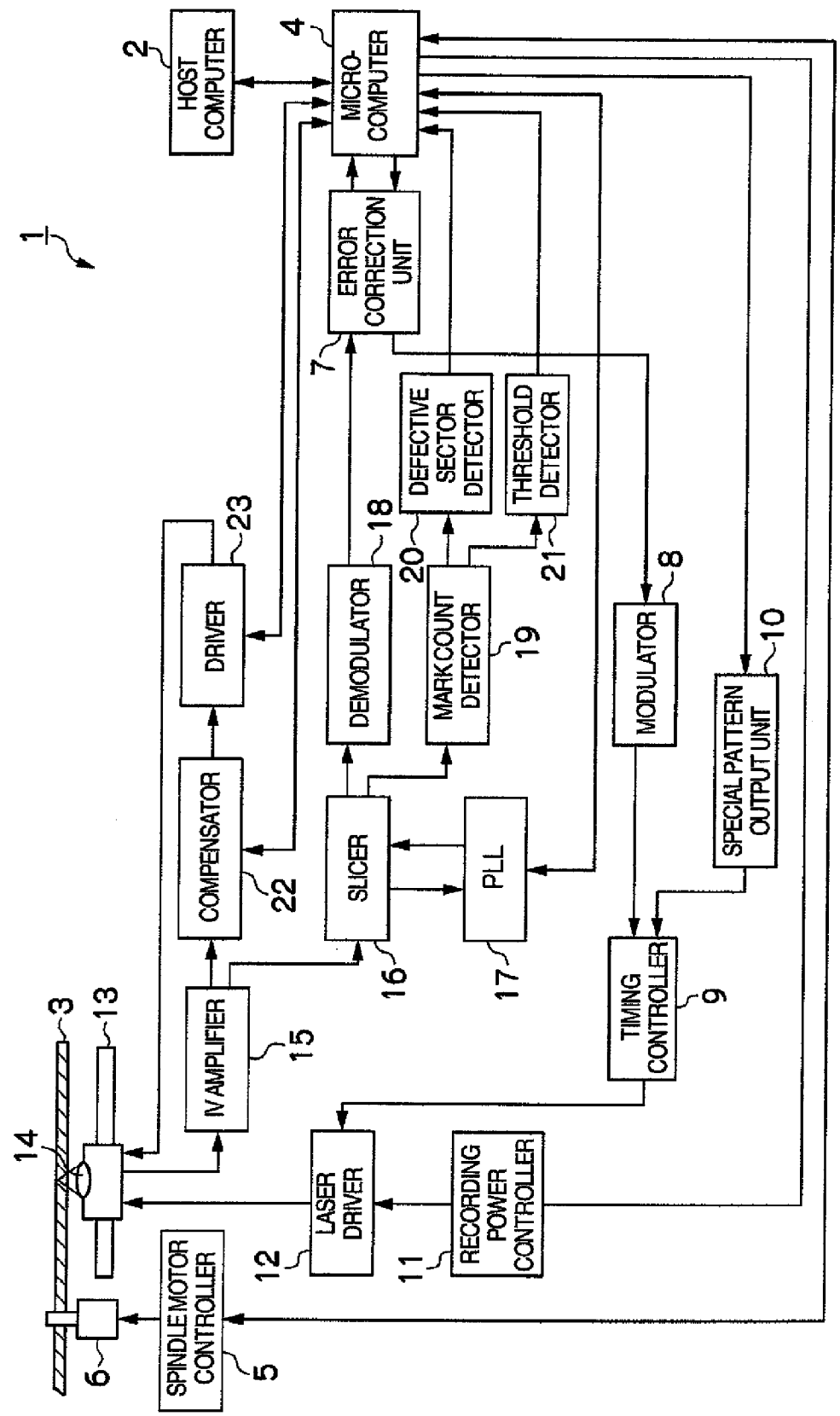
FIG. 1 is a block diagram illustrating a whole structure an optical disk apparatus according to an embodiment of the present invention.

Reference numeral 1 shown in FIG. 1 denotes an optical disk apparatus according to the present embodiment.

This optical disk apparatus 1 is configured to record data onto an optical disk 3 and to reproduce the data recorded onto the optical disk 3 according to requirements from a host computer 2.

In the case of this optical disk apparatus 1, various commands transmitted from the host computer 2 are given to a microcomputer control circuit 4. The microcomputer control circuit 4 is configured by a microcomputer including a CPU (not shown) and an internal memory (not shown) in which various tables and programs are stored. Further, the microcomputer control circuit 4 performs necessary control processes and arithmetic processes based on commands given from the host computer 2 and various information sets given from various circuits within the optical disk apparatus 1.

For example, when a record command is given from the host computer 2, the microcomputer control circuit 4 drives a spindle motor 6 via a spindle motor controller 5, thereby rotating the optical disk 3 mounted in a predetermined state. At this time, a frequency generator (not shown) attached to the spindle motor 6 generates FG (Frequency Generator) signals at each rotation of predetermined angles in an output axis of the spindle motor 6. The spindle motor controller 5 binarizes these FG signals and transmits the obtained binary FG signals to the microcomputer control circuit 4. Further, based on these binary FG signals, the microcomputer control circuit 4 controls the spindle motor 6 so as to rotate the mounted optical disk 3 in a rotation state according to a recording method (e.g., a CAV method where the number of rotations is held constant, or a CLV method where the speed that an optical head traces the optical disk 3 is held constant) of the optical disk 3.

Further, the microcomputer control circuit 4 transmits, along with a recording command, data to be recorded (hereinafter, referred to as recording object data) given from the host computer 2 to a modulator 8 via an error correction unit 7. The modulator 8 converts the recording object data into a signal series of 0 or 1 with a length of 3 T to 14 T (T is a reference clock time) according to a determined modulation rule, and transmits the signal series as modulating signals to a timing controller 9.

On the other hand, the microcomputer control circuit 4 transmits a generation command to a special pattern output unit 10.

The special pattern output unit 10 repeatedly generates a pattern as a reference length of a recording mark length. In the present embodiment, the special pattern output unit 10 generates a pattern with a reference length of 6 T. When an erasing process of recording marks to be recorded onto the optical disk 3 is finished, the special pattern output unit 10 is controlled so as to be operated. The special pattern output unit 10 transmits the generated reference length to the timing controller 9.

The timing controller 9 transmits a timing signal as recording power or erasing power to a laser driver 12 based on the modulated signal transmitted from the modulator 8 or the special pattern output unit 10. Further, after completion of the erasing process of the recording mark, the timing controller 9 transmits the reference length.

A recording power controller 11 is a controller operating based on control commands outputted from the microcomputer control circuit 4. Further, the recording power controller 11 controls the recording power or erasing power of laser beam (recording light) irradiated onto the optical disk 3 as well as the switching of power in each sector of the optical disk 3.

The laser driver 12 supplies a current as a radiant power output of reproducing power, erasing power, and recording power to laser diodes within an optical pickup 13 based on the timing signal transmitted from the timing controller 9. At this time, each current setting value is controlled by the recording power controller 11. As a result, a laser beam is emitted based on driving signals, and further is condensed onto a recording layer of the optical disk 3 through an objective lens 14. At this time, by driving a slider mechanism, the microcomputer control circuit 4 allows a slider having fixed thereon the optical pickup 13 to move in the radial direction of the optical disk 3 at a predetermined speed. Thereby, the recording object data is recorded onto the optical disk 3.

Reflected light of the laser beam irradiated onto the optical disk 3 is induced by a photodetector (not shown) within the optical pickup 13 through the objective lens 14 and then is subjected to a photoelectric conversion in this photodetector. Then, current outputs obtained by this photoelectric conversion are converted into RF signals as voltage outputs by an IV amplifier 15, and further, the converted RF signals are digitally converted by a slicer 16.

The slicer 16 transmits to a demodulator 18 digital RF signals that are allowed to synchronize with clock frequencies by a PLL (Phase Locked Loop) 17. On the other hand, the slicer 16, when detecting the after-mentioned mark count MK from the digital RF signals using a mark count MK detector 19, detects a sector of the optical disk 3 having detected therein the mark count MK using a defective sector detector 20 as well as detects a threshold of the after-mentioned recording power by a threshold detector 21 using the detected mark count MK. The detected defective sector and thresholds of the recording power are transmitted to the microcomputer control circuit 4. The microcomputer control circuit 4 calculates an optimum recording power value using the above-described information, determines power and irradiation position of the laser beam to be irradiated next, and informs the recording power controller 11 of them.

The demodulator 18 performs a predetermined demodulation process to the digital RF signals, and transmits the obtained reproduction data to the microcomputer control circuit 4 via the error correction unit 7.

Further, the optical pickup 13 transmits the current output obtained by the photoelectric conversion to the IV amplifier 15 and calculates the output of the IV amplifier 15, thereby obtaining a servo signal. The optical pickup 13 transmits the obtained servo signal to a compensator 22, and further transmits the servo signal as the servo control output to a driver 23.

The compensator 22 compensates characteristics of the focus control and the tracking control, and outputs a driving signal for performing focus control and tracking control to the optical disk 3 as well as outputs a tilt driving signal for instructing a tilt angle of the objective lens 14. The driver 23, when amplifying these signals, applies the amplified signals to the optical pickup 13. Thereby, the laser beam emitted from the optical pickup 13 is just focused onto the recording layer of the optical disk 3, and is irradiated onto a track center.

(2) Adjustment Method of Recording Power

A test writing area PCA is intended (reserved) of a plurality of blocks, and one block is composed of 16 sectors. The optical disk apparatus 1 uses 16 sectors by a single test write operation. The optical disk apparatus 1 detects optimum recording power and records information onto a data area by the optimum recording power while stepwise changing recording power Pw in the test writing area PCA.

As a method for detecting the optimum recording power, various methods are used. Any method finds threshold power Pth as the recording power Pw of recording start point and uses, as the recording power, power obtained by multiplying the threshold power Pth by a predetermined value. In addition, a predetermined value is normally written in the optical disk 3. In case a recording mark is left behind or characteristic abnormality of a recording layer is observed in the test writing area PCA, the threshold power Pth is different from threshold power Pth that is found in the normal test writing area PCA; therefore, suitable recording power cannot be calculated. For detecting the stable threshold power Pth, a defective sector (defective area) in which the recording mark is left behind or in which the characteristic abnormality of a recording layer is observed is required to be eliminated from detection objects.

In the present embodiment, a description will be made on a method for detecting a defective sector using a mark counting method to adjust the recording power.

(2-1) Mark Counting Method

At first, a mark counting method will be described.

The mark counting method is a method for determining a reference length among recording mark lengths recorded by a mark length recording method (or a mark edge recording method), and for showing an index indicating how far the recording mark length is from the reference length. The optical disk apparatus 1 evaluates a recording mark recorded during a recording operation using the mark counting method during a reproducing (fetching) operation. Herein, the mark length recording method is one method for recording information onto the optical disk 3, and is a method that is recorded such that information is given to edge positions of the recording mark and an interval (a recording mark length, or a length of a space between the recording marks) between edges indicates the information amount. The recording mark length of 3 T to 14 T exists in the above-described optical disk 3.

Figure 2A:
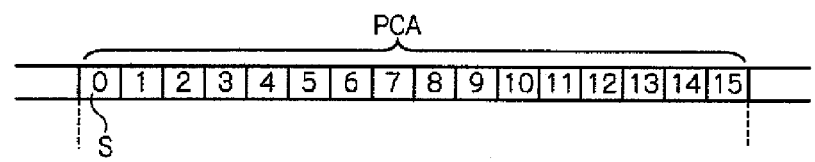
FIG. 2A is a schematic diagram illustrating a test writing area at the time of describing a mark counting method.
Figure 2B:
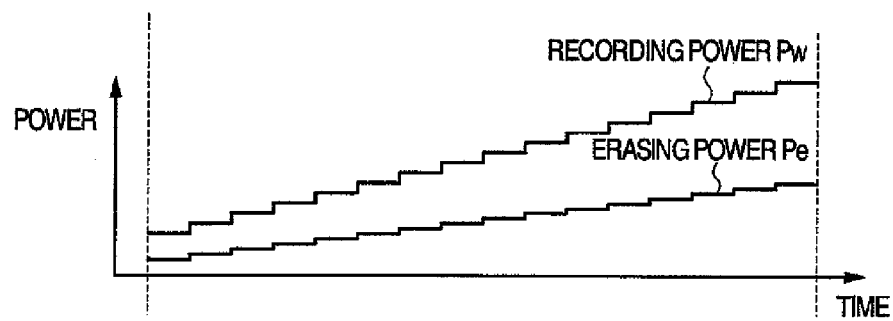
FIG. 2B is a schematic diagram illustrating a recording process at the time of describing a mark counting method.
Figure 2C:
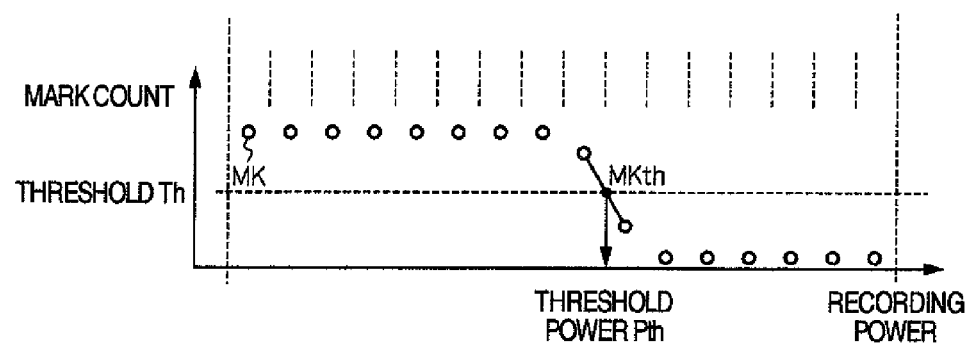
FIG. 2C is a schematic diagram illustrating a mark counting process at the time of describing a mark counting method.

FIG. 2A is a diagram obtained by dividing the test writing area PCA into sectors. FIG. 2B is a diagram where the recording power Pw and the erasing power Pe are stepwise changed for each sector S. Further, FIG. 2C illustrates a graph where each sector is measured by the mark counting method so as to correspond to the sector. The vertical axis of FIG. 2C represents a ratio (hereinafter, referred to as a mark count MK) detected as the recording mark length that gets out of a range as the reference length or that is not the reference length for each recording mark length obtained in each sector. Here, when appropriate recording power is recorded within each sector and each recording mark length is detected in a range as the reference length, the mark count MK represents a small value. On the contrary, when each recording mark length is deviated from the appropriate recording power, in particular, when the recording power is low, a number of the recording mark lengths are detected out of the range as the reference length and the mark count MK represents a high value. As shown in FIG. 2B, since the recording power Pw and the erasing power Pe are changed for each sector during the recording operation, the horizontal axis corresponds to the recording power of each sector.

Suppose, for example, that the reference length of 6 T is set and the recording mark length which is recorded onto one arbitrary sector among all the normal sectors of the test writing area PCA is detected as a length of 5 T. As shown in FIG. 2C, in this case, since the recording mark length is shorter than the reference length, the mark length is determined to be not an appropriate mark; therefore, the mark count MK indicates a value of 100%. An arbitrary mark count MK in which the recording mark length more approximates to the reference length is set to a threshold Th, and the X-coordinate of the intersection point MKth that intersects with this threshold is detected as a threshold power Pth.

On the other hand, when the recording mark that is recorded onto the test writing area PCA is not completely erased, a defective sector exists. The recording marks that are recorded onto the test writing area PCA including this defective sector during the reproducing operation are evaluated by the mark counting method regardless of the above-described state of the optical disk 3. In this case, a value of the mark count MK corresponding to the defective sector does not correspond to a value of the recording power of the sector, and an appropriate threshold power Pth is not detected. For this purpose, an influence from the defective sector is required to be eliminated to detect an appropriate threshold power Pth for detecting the optimum recording power.

(2-2) Detection Method of Defective Sector

Figure 3:
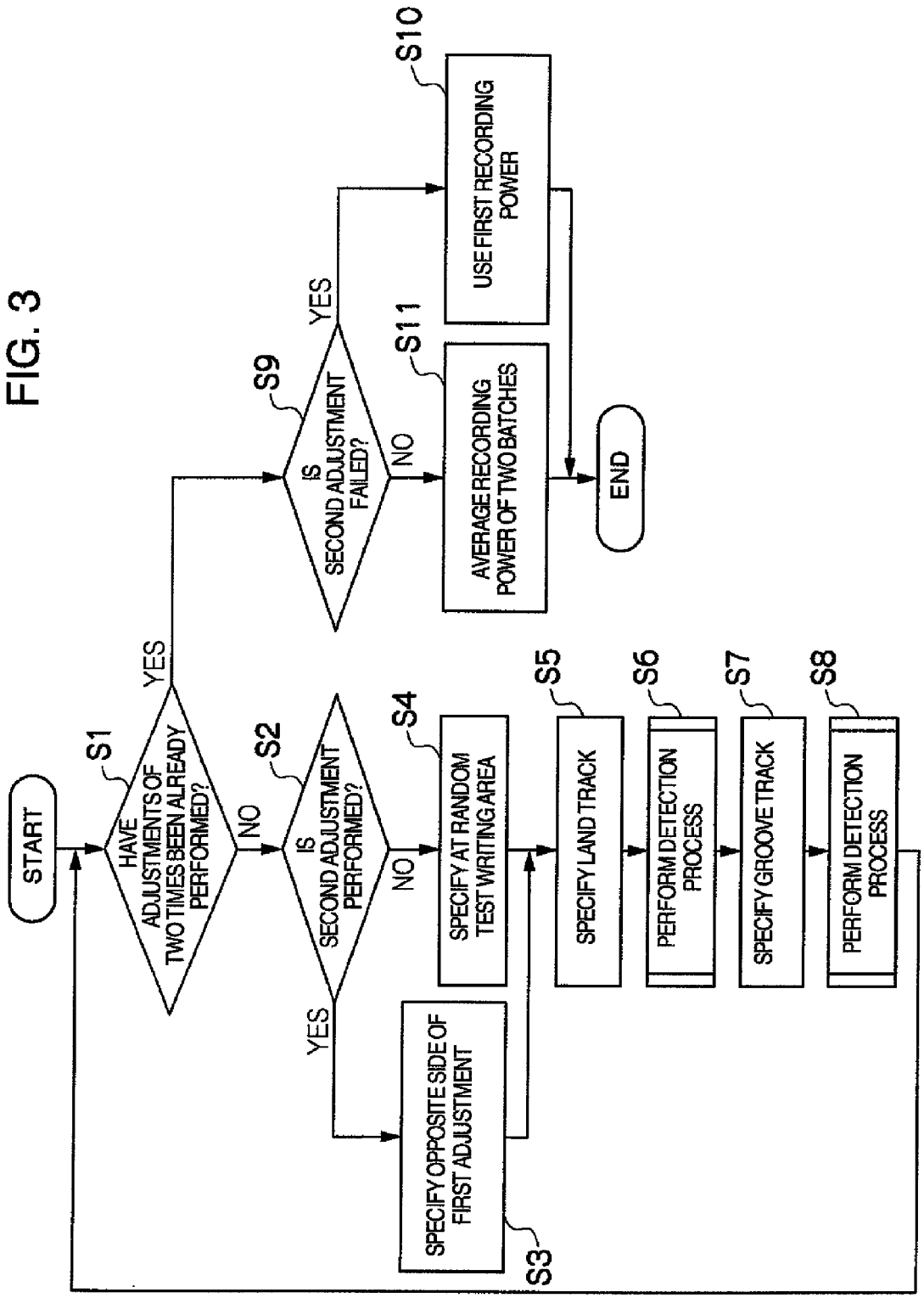
FIG. 3 is a flowchart illustrating an adjustment process of recording power.

Next, in the mark counting method, a method for detecting the defective sector will be described with reference to a flowchart of FIG. 3. The CPU of the optical disk apparatus 1 detects the defective sector in the test writing area PCA of the optical disk 3 as well as detects the appropriate threshold power Pth. The flowchart is started at the time of setting up the optical disk 3 or recording data onto the optical disk 3.

In addition, in the present embodiment, a processing procedure will be described on a case where a test writing of once is performed in each test writing area PCA within an inner periphery and outer periphery of the optical disk 3 and further the optical disk 3 is a DVD-RAM. In the case of the DVD-RAM, the appropriate threshold power Pth is detected at each land track and groove track.

The CPU determines whether or not an adjustment of the recording power is performed by once in an inner periphery and an outer periphery, respectively, the adjustments of two times are collectively performed in the test writing area PCA within the inner periphery and outer periphery of the optical disk 3 (step S1).

When the adjustments of two times are not performed (step S1: NO), the CPU determines whether or not a second adjustment is performed for a detection of the threshold power Pth (step S2).

When the second adjustment is performed (step S2: YES), the CPU specifies the test writing area PCA (one block) on the opposite side, across a disk center, of the test writing area PCA in which the first adjustment is performed to the center of the optical disk 3 (step S3). In addition, the test writing area PCA is not required to be exactly positioned on the opposite side of the test writing area PCA, and may be approximately positioned on the opposite side of the test writing area PCA.

When the first adjustment is performed (step S2: NO), the CPU specifies at random the test writing area PCA (one block) for detecting the threshold power Pth from among all the test writing areas PCA (step S4).

When the test writing area PCA for detecting the threshold power Pth is determined, the CPU specifies a land track for inducing a laser beam onto the determined test writing area PCA (step S5).

When specifying the land track, the CPU performs a detection process of the after-mentioned defective sector (step S6). Further, the CPU detects the threshold power Pth except for the defective sector and calculates the optimum recording power.

Thereafter, the CPU specifies the groove track for inducing the laser beam onto the determined test writing area PCA (step S7). The CPU, when performing the detection process of the after-mentioned defective sector again (step S8), performs a processing of step S1.

In step S1, when the second adjustment of the recording power is already finished (step S1: YES), the CPU determines whether or not the second adjustment is failed (step S9). When the second adjustment is failed (step S9: YES), the CPU uses only the result of each recording power Pw of the land track and groove track which are got at the first adjustment (step S10), and finishes this processing.

When succeeding in two adjustments (step S9: NO), the CPU averages the respective recording power Pw of two batches in the land track and the groove track (step S11), and finishes this processing.

Figure 4:
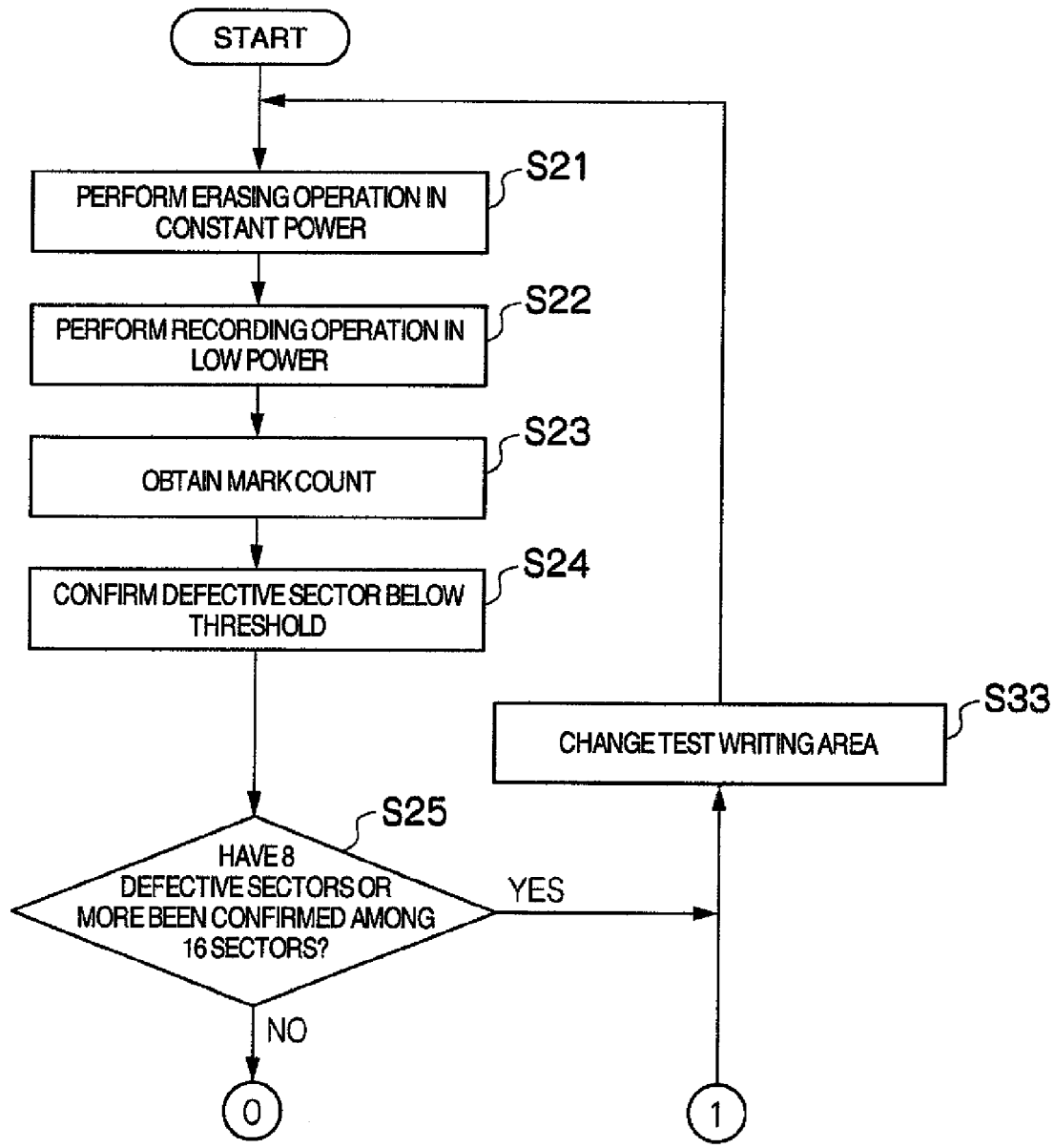
FIG. 4 is a flowchart illustrating a detection process of a defective sector.
Figure 5:
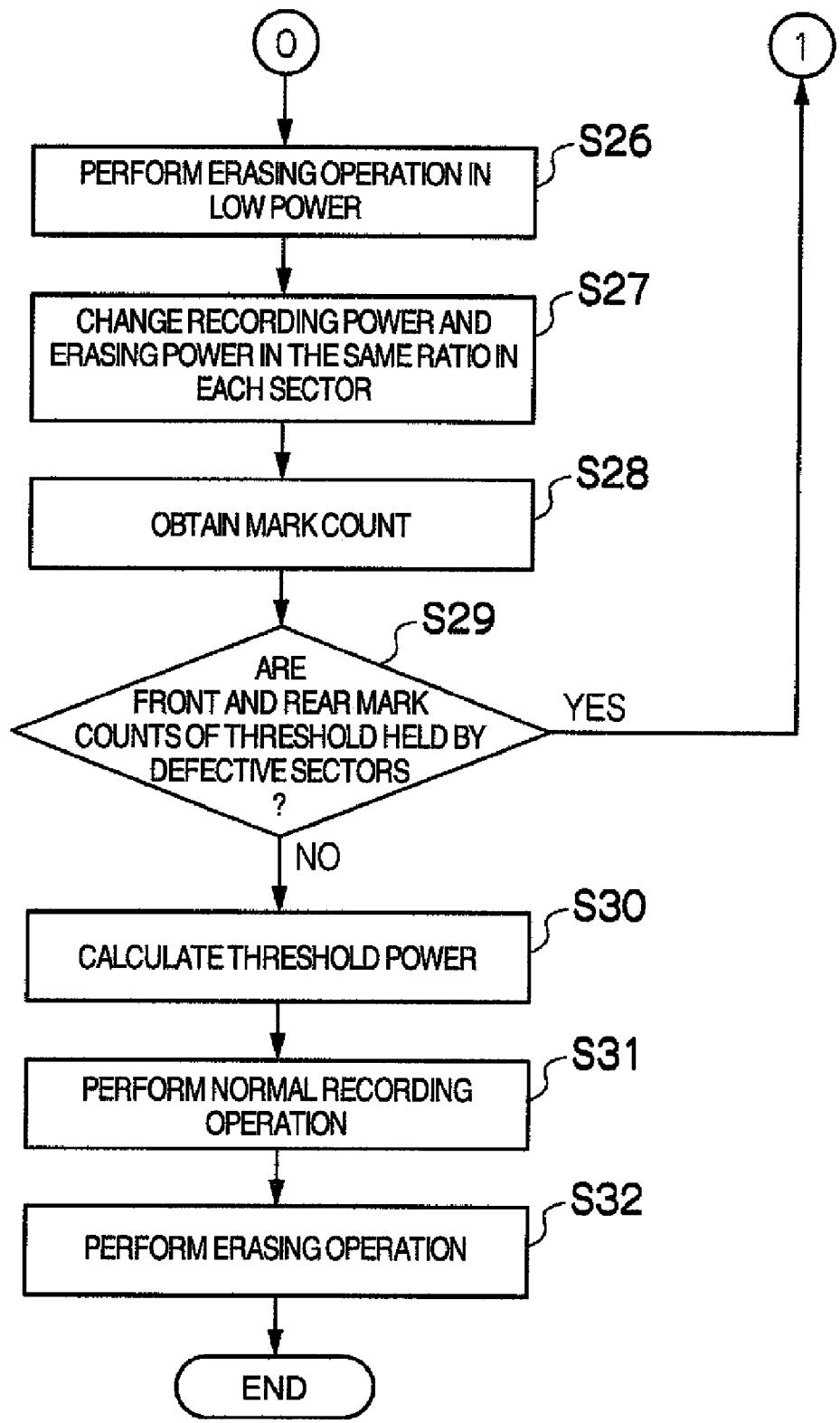
FIG. 5 is a flowchart illustrating a detection process of a defective sector.

Subsequently, the detection process of the defective sector will be described with reference to flowcharts of FIGS. 4 and 5.

The CPU performs an erasing operation onto the determined test writing area PCA using the constant erasing power (step S21). When the recording power is adjusted for the first time, the CPU performs an erasing operation onto the determined test writing area PCA using the erasing power Pe described in the optical disk 3. On the other hand, when the test writing is performed even once as the adjustment of the recording power, the CPU erases the recording mark that is recorded onto the test writing area PCA using the erasing power Pe got at the time of the adjustment.

Next, the CPU performs a recording operation onto the test writing area PCA using the recording power of constant low power (step S22). The constant low power means power lower than the threshold power Pth. When the recording power is adjusted for the first time, the CPU performs the recording operation using a recording power as a value 60% of the recording power described in the optical disk 3. When the recording power is adjusted even once, the CPU performs the recording operation using a recording power as a value 60% of the recording power got at the time of the adjustment.

The CPU obtains the mark count MK of the recording mark recorded using constant low power for each sector (step S23), and confirms the defective sector below the mark count MK threshold (hereinafter, referred to as a defective sector threshold) STh that is set to detect the defective sector (step S24). For surely detecting the defective sector, in this threshold STh used for a detection of the defective sector, set is a threshold higher than the threshold Th of the mark count MK required at the time of calculating the recording power.

Next, the CPU determines whether or not the number of confirmed sectors is the defective sectors not less than 8 sectors (step S25). In the present embodiment, the number of sectors as the threshold is set to 8 sectors; however, there may be used a value at the time of determining whether or not to use the test writing area PCA (16 sectors) specified in step S3 or S4, and therefore, it is not limited to 8 sectors.

When the number of the defective sectors is not less than 8 sectors (step S25: YES), the CPU determines that the specified test writing area PCA (16 sectors) is not used. The CPU changes the test writing area PCA to be adjusted of the recording power (step S33), and performs step S21 again in the test writing area PCA of a change destination.

When the number of the defective sectors is less than 8 sectors (step S25: NO), the CPU erases the recording mark that is recorded using low power (step S26). Next, the CPU performs the recording operation while stepwise changing the erasing power Pe and recording power Pw for each sector (step S27). In the present embodiment, since a ratio between the recording power Pw and the erasing power Pe is fixed, the erasing power Pe and the recording power Pw are changed using the same ratio.

The CPU obtains the mark count MK from the recording mark that is recorded onto normal sectors (step S28), and determines whether or not the front and rear mark counts MK interposing the threshold Th of the mark count MK are the mark counts MK of the defective sectors confirmed in step S24 (step S29).

When the front and rear mark counts MK interposing the threshold Th of the mark count MK are the mark counts MK of the defective sectors (step S29: YES), the CPU does not use the test writing area PCA (16 sectors); however, changes the specified test writing area PCA (step S33) and performs step S21 again in the test writing area PCA of a change destination.

When the front and rear mark counts MK interposing the threshold Th of the mark count MK are the mark counts MK of the normal sectors (step S29: NO), the CPU calculates the threshold power Pth (step S30). In the present embodiment, the front and rear mark counts MK interposing the threshold Th of the mark count MK are linearly interpolated to calculate the threshold power Pth. Suppose that the x axis represents the recording power, the y axis represents the mark count MK, the coordinates of the front and rear mark counts MK are represented as MK0 (x0, y0) and MK1 (x1, y1), and the coordinates of the threshold mark count MK desired to be calculated are represented as MKth (x, y).

At this time, the following formula (1) holds.

$$(y-y0)/(y1-y0)=(x-x0)/(x1-x0) \quad (1)$$

When using $\alpha$ as an interpolation coefficient, the following formulas (2) and (3) hold.

$$\alpha=(y-y0)/(y1-y0) \quad (2)$$

$$\alpha=(x-x0)/(x1-x0) \quad (3)$$

Therefore, the following formulas (4) and (5) hold.

$$y=y0+\alpha(y1-y0) \quad (4)$$

$$x=x0+\alpha(x1-x0) \quad (5)$$

Thereby, the threshold power Pth as x can be calculated from y that is the threshold Th of the mark count MK.

After performing the recording operation onto the test writing area PCA using the recording power Pw calculated from the threshold power Pth (step S31), the CPU performs the erasing operation onto the test writing area PCA using the erasing power Pe calculated from the threshold power Pth (step S32), and finishes this processing.

Since the processing procedure of steps from S5 to S8 is the same as that of the case where the optical disk 3 is the DVD-RAM, a scanning process of each of the land track and the groove track is performed; however, these processing procedures are not required to be performed in all the optical disks 3. In the optical disk 3 in which the data area is disposed on one side, after the CPU specifies the test writing area PCA, the scanning process is sufficient to be performed. Alternatively, the CPU may perform the scanning process only either in the inner periphery or in the outer periphery of the optical disk 3. Further, when deviation of the recording power is detected, or when ambient temperature is changed by a specified value or more, the test writing is performed again. At this time, the CPU may adjust the recording power to the test writing area PCA only either on the inner periphery side or on the outer periphery side, and correct the recording power on the side in which the adjustment is not performed using a difference or ratio between this adjustment result and the previous adjustment result.

For an example of the power setting value, in the optical disk of the DVD-RAM 3x, the CPU performs the recording operation onto the test writing area PCA using 6.8 mW as constant low power. At this time, a value of the recording power obtained by the above-described method is 14.1 mW, and a value of the erasing power similarly obtained is 5.6 mW, respectively.

(2-3) Specific Example

This processing will be here described with reference to the specific examples.

(2-3-1) Case of Normal Sector

Figure 6A:
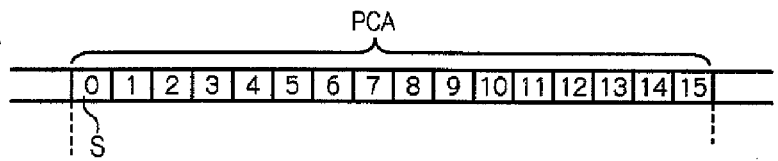
FIG. 6A is a schematic diagram illustrating a test writing area at the time of describing a mark counting method.

FIG. 6A illustrates the test writing area PCA divided by a sector S.

Figure 6B:
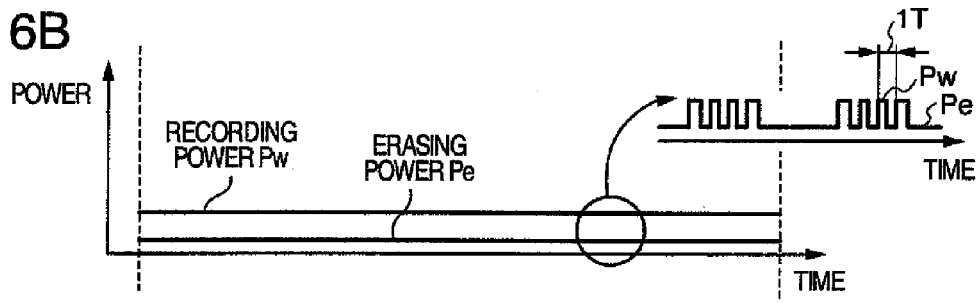
FIG. 6B is a schematic diagram for performing an erasing process in constant low power at the time of describing a mark counting method.

In a graph of FIG. 6B, illustrated is a state of the erasing power Pe and the recording power Pw in which the CPU records the recording power Pw onto the test writing area PCA in constant low power in step S22. In the present embodiment, since a ratio between the recording power Pw and the erasing power Pe is fixed, when the recording power Pw is calculated, the erasing power Pe of constant low power is calculated.

Figure 6C:
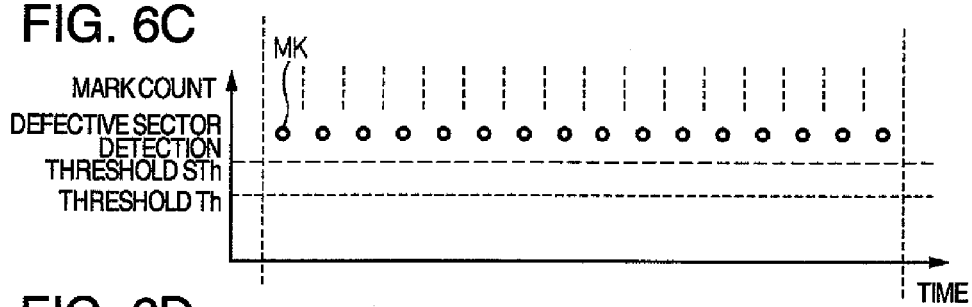
FIG. 6C is a schematic diagram illustrating a mark counting process.
Figure 6D:
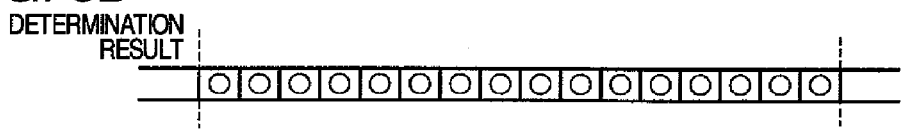
FIG. 6D is a schematic diagram illustrating a determination result at the time of describing a mark counting method.

In a graph of FIG. 6C, illustrated is the mark count MK that is obtained for each sector S by the CPU in step S23. The vertical axis represents the mark count MK, and the horizontal axis represents the recording power Pw. A white circle of FIG. 6C shows the mark count MK obtained in each sector S. In step S23, after erasing once the recording mark that is recorded onto the test writing area PCA, the CPU freshly records the recording mark in low power; therefore, a recording mark length that is recorded in low power is shorter than the reference length. Therefore, since the recording mark length recorded in low power is largely deviated from the reference length, the mark count MK has a high value. As in the determination result shown in FIG. 6D, when all values of the mark counts MK are higher than the threshold STh for detecting defective sectors, it is shown that no defective sector exists.

Figure 6E:
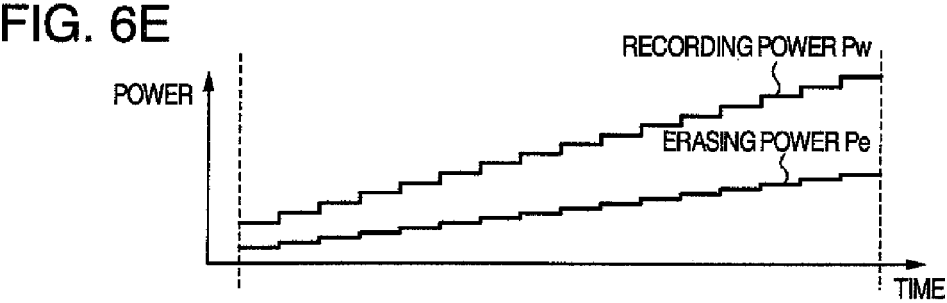
FIG. 6E is a schematic diagram illustrating a recording process at the time of describing a mark counting method.
Figure 6F:
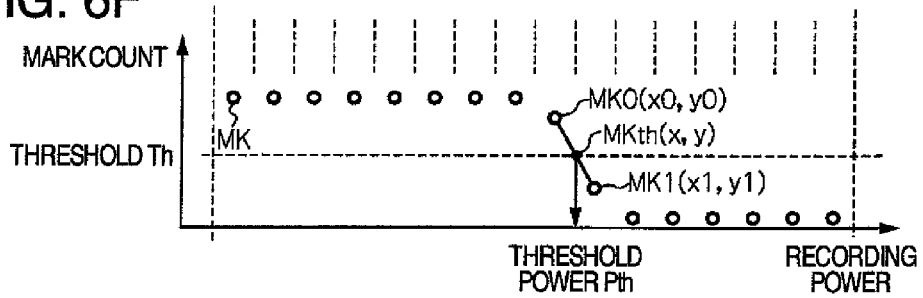
FIG. 6F is a schematic diagram illustrating a mark counting process.

As shown in FIG. 6E, the CPU stepwise changes the recording power Pw for each sector S. Further, since a ratio between the recording power Pw and the erasing power Pe is fixed, the CPU changes also the erasing power Pe for each sector S at the same time as the recording power Pw (step S27). As shown in FIG. 6F, the CPU obtains the mark count MK for each sector S (step S28). Thereafter, the CPU confirms that the front and rear mark counts MK interposing the threshold Th of the mark count are not the mark counts MK that is held by the defective sector (step S29), and calculates the threshold power Pth (step S30).

(2-3-2) Case where Defective Sectors S Not Less than 8 Sectors S Exist

Figure 7A:
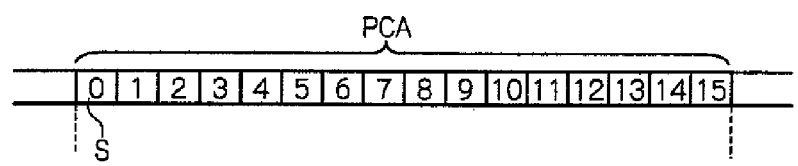
FIG. 7A is a schematic diagram illustrating a test writing area at the time of describing a mark counting method.

FIG. 7A illustrates the test writing area PCA divided by a sector S.

Figure 7B:
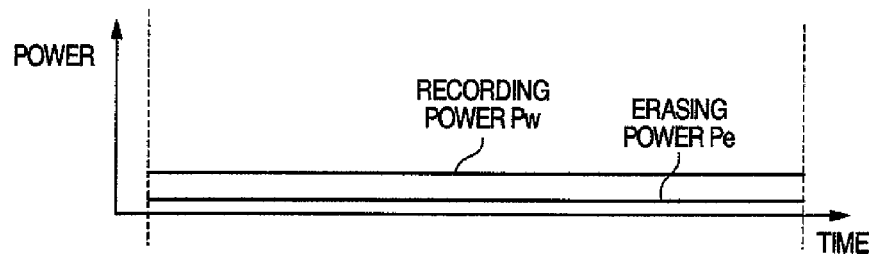
FIG. 7B is a schematic diagram for performing an erasing process in constant low power at the time of describing a mark counting method.

In a graph of FIG. 7B, illustrated is a state of the erasing power Pe and the recording power Pw in which the CPU records the recording power Pw onto the test writing area PCA in constant low power in step S22.

Figure 7C:
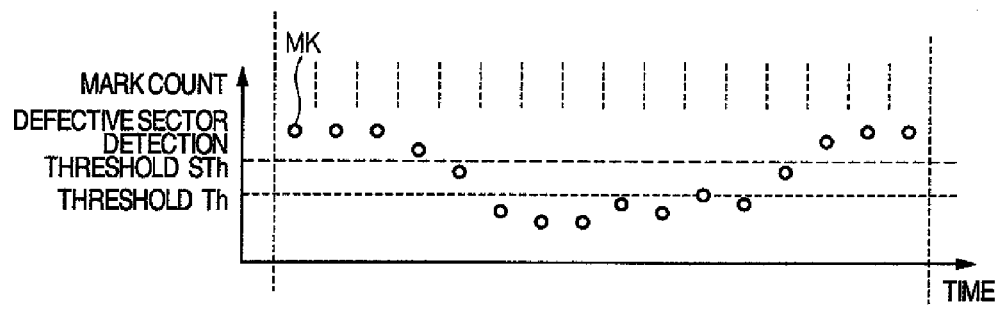
FIG. 7C is a schematic diagram illustrating a mark count.
Figure 7D:
FIG. 7D is a schematic diagram illustrating a determination result at the time of describing a mark counting method.

In a graph of FIG. 7C, illustrated is the mark count MK that is obtained for each sector S by the CPU in step S23. The vertical axis represents the mark count MK, and the horizontal axis represents the recording power Pw. A white circle of FIG. 7C shows the mark count MK obtained in each sector S. Under normal circumstances, since the recording mark length recorded in low power is largely deviated from the reference length, the mark count MK has a high value. However, the mark count MK is recorded onto the test writing area PCA, in some cases, with its value being lower than the threshold STh for detecting a defective sector. In this portion, since the recording mark that is not completely erased exists in the test writing area PCA, the mark approximates to the reference length, and therefore, is recorded with its value being lower than the threshold STh. As in the determination result shown in FIG. 7D, the sectors S that hold the mark counts MK lower than the threshold STh for detecting the defective sector are determined to be defective sectors (areas). In addition, in this example, 9 sectors exist as the defective sector and its number is the number of sectors not less than 8 sectors as the threshold sector; therefore, the CPU determines that this test writing area PCA (16 sectors) is not used (step S25: YES).

(2-3-3) Case where Defective Sectors S Less than 8 Sectors S Exist

Figure 9A:
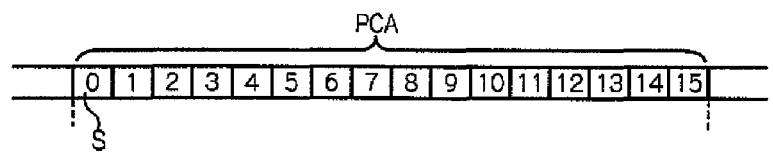
FIG. 9A is a schematic diagram illustrating a test writing area at the time of describing a mark counting method.

FIGS. 8A and 9A illustrate the test writing area PCA divided by a sector S.

Figure 9B:
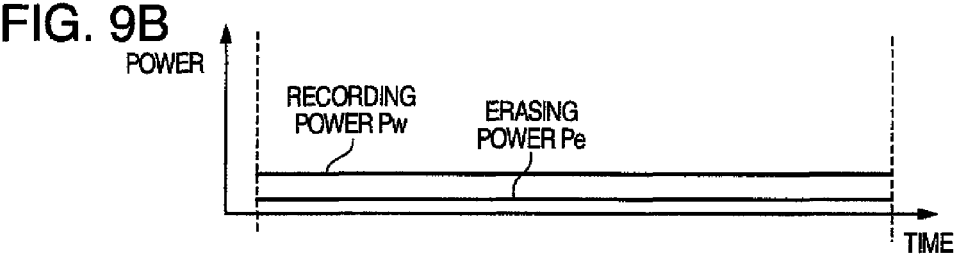
FIG. 9B is a schematic diagram for performing an erasing process in constant low power at the time of describing a mark counting method.

In graphs of FIGS. 8B and 9B, illustrated is a state of the erasing power Pe and the recording power Pw in which the CPU records the recording power Pw onto the test writing area PCA in constant low power in step S22.

Figure 9C:
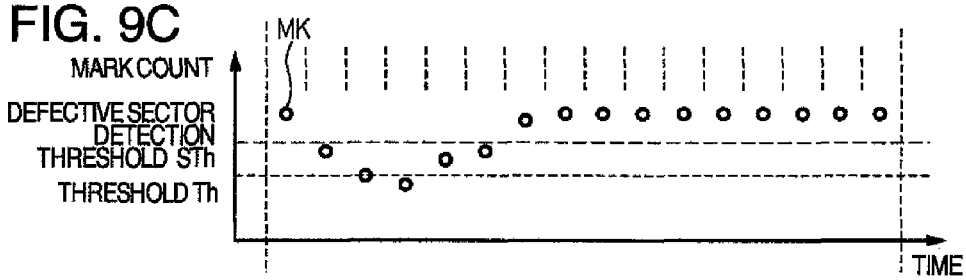
FIG. 9C is a schematic diagram illustrating a mark count.
Figure 9D:
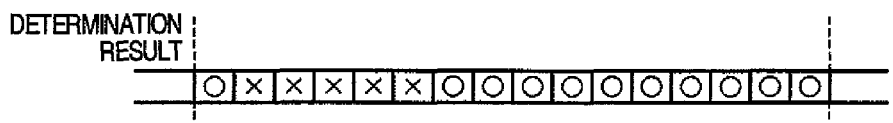
FIG. 9D is a schematic diagram illustrating a determination result at the time of describing a mark counting method.

In graphs of FIGS. 8C and 9C, illustrated is the mark count MK that is obtained for each sector S by the CPU in step S23. FIGS. 8C and 9C illustrate a state where an evaluation is performed by the mark counting method. The vertical axis represents the mark count MK, and the horizontal axis represents the recording power Pw. A white circle of FIGS. 8C and 9C shows the mark count MK obtained in each sector S. The mark count MK is recorded onto the test writing area PCA, in some cases, with its value being lower than the threshold STh for detecting a defective sector. As in the determination result shown in FIGS. 8D and 9D, the sectors S that hold the mark counts MK lower than the threshold STh for detecting the defective sector are determined to be defective sectors (areas). FIG. 8D illustrates a case where the defective sectors S are determined to exist on a high power side, and FIG. 9D illustrates a case where the defective sectors S are determined to exist on a low power side.

The number of any defective sectors is also 5 sectors and is the number of sectors less than 8 sectors as the threshold sector, and therefore, the CPU determines that this test writing area PCA is used (step S25: NO).

Figure 9E:
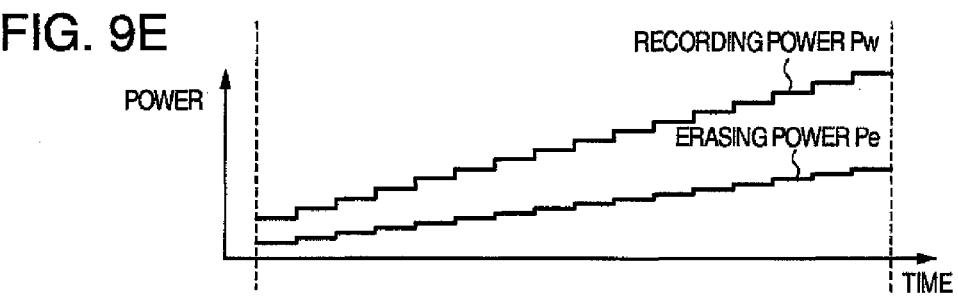
FIG. 9E is a schematic diagram illustrating a recording process at the time of describing a mark counting method.
Figure 9F:
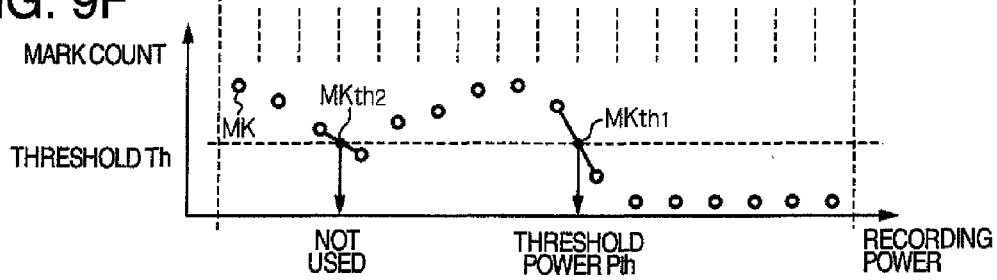
FIG. 9F is a schematic diagram illustrating a mark count.

As shown in FIGS. 8E and 9E, the CPU performs the recording operation while stepwise changing the erasing power Pe and recording power Pw for each sector S (step S27), and the CPU obtains the mark count MK as shown in FIGS. 8F and 9F (step S28). Then, the CPU determines whether or not the front and rear mark counts MK interposing the threshold Th of the mark count are mark counts held by defective sectors S. When an intersection point of the threshold Th of the mark count and the front and rear mark counts MK interposing the threshold TH of the mark count is set, two intersection points (MKTh1, MKTh2) exist. However, the threshold Th of the mark count, and the front and rear mark counts interposing the intersection point MKTh2 are mark counts held by the sector S that is determined to be a defective sector, and therefore, the threshold power Pth is not calculated using these mark counts (step S29: YES). On the other hand, the threshold Th of the mark count, and the front and rear mark counts interposing the intersection point MKTh1 are not mark counts MK held by the sector S that is determined to be a defective sector (step S29), and therefore, the CPU calculates the threshold power Pth using these mark counts MK (step S30).

As described above, since a defective sector is detected and the threshold power Pth is detected except for the detected defective sector, the optimum recording power Pw can be detected. In the present embodiment, the mark counting method is described; however, the method for detecting a defective sector includes another appellation or method, such as an error pulse method in addition to an appellation of the mark counting method. These methods also belong to a scope of the present invention.

(3) Detection of Threshold Power Using Another Method

Next, another method for detecting the optimum recording power Pw will be described.

(3-1) Level System

A level system is a system for measuring and evaluating the recording power Pw using as an index a signal component of a reproduction signal to the recording power Pw during the reproduction. The optical disk apparatus 1 obtains a signal component of the reproduction signal for each sector S. When the optical disk 3 is a CD-RW or a DVD+RW, the threshold power Pth is detected using this system in many cases.

Figure 10A:
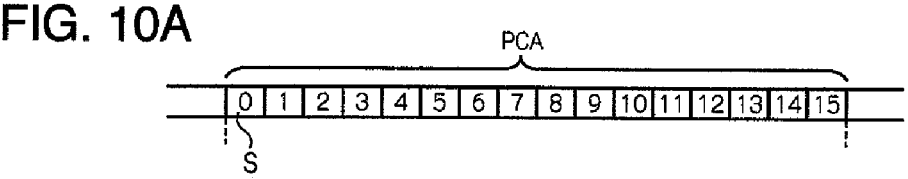
FIG. 10A is a schematic diagram illustrating a test writing area at the time of describing a level system.
Figure 10B:
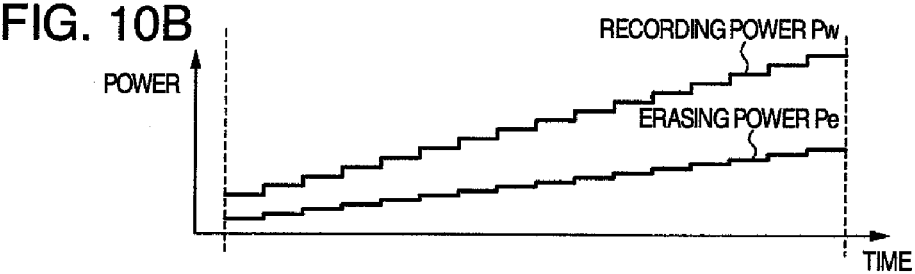
FIG. 10B is a schematic diagram illustrating a recording process at the time of describing a level system.
Figure 10C:
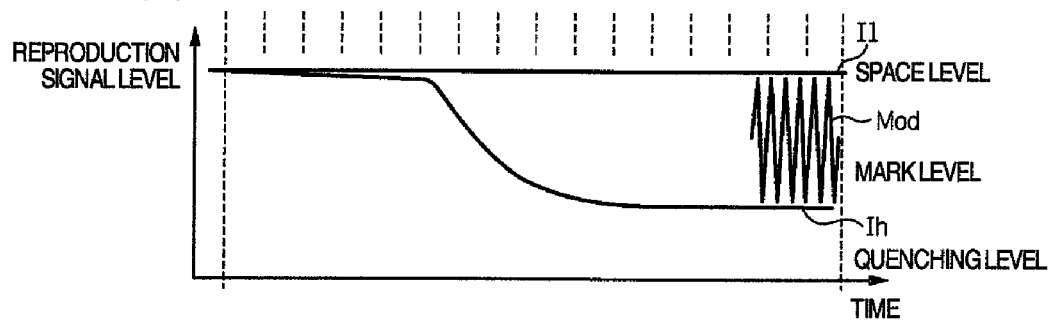
FIG. 10C is a schematic diagram illustrating a reproduction signal at the time of describing a level system.
Figure 10D:
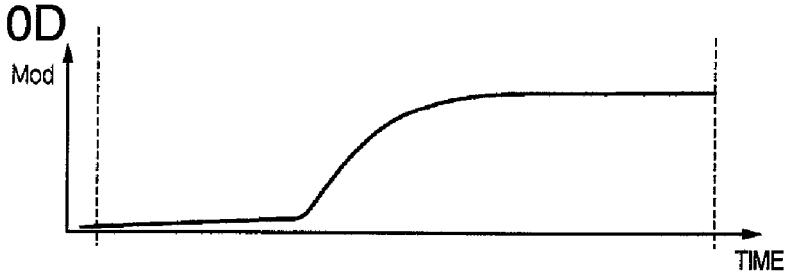
FIG. 10D is a schematic diagram illustrating a modulation depth process at the time of describing a level system.

In a recording process shown in FIG. 10B, when the recording power Pw is stepwise changed in each sector S shown in FIG. 10A, the reproduction signal as shown in FIG. 10C can be obtained. Using as an index a signal component of this reproduction signal, a modulation depth is obtained. Specifically, the modulation depth is defined as follows.

$$\text{Mod} = (I_h - I_l)/I_h \tag{6}$$

Figure 10E:
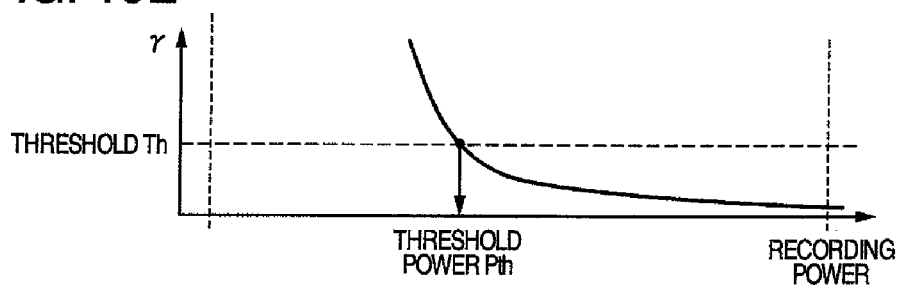
FIG. 10E is a schematic diagram illustrating a value γ at the time of describing a level system.

The symbol Mod denotes a modulation depth, the symbol Il denotes a low level value (mark level) among signal components of the reproduction signal, and the symbol Ih denotes a high level value (space level) among signal components of the reproduction signal. A high modulation depth shows that the recording operation is performed by high recording power. In the level system, the threshold power Pth is calculated based on this modulation depth. In a graph of FIG. 10E, the vertical axis represents the value γ, and the horizontal axis represents the recording power Pw. The Greek letter γ is defined as follows.

$$\gamma = d\text{Mod} \cdot Pw / \text{Mod} \cdot dPw \quad (7)$$

The recording power as a targeted value γ is equal to the threshold power Pth. Since a value γ is a rate of change of the modulation depth to the recording power Pw, when a ratio between the recording power Pw and the erasing power Pe, and a light strategy are known under any conditions, a stable threshold power Pth can be calculated. In addition, the recording mark is recorded by a mark-length recording method also in the level system.

Next, a method for detecting a defective sector using the level system will be described.

(3-1-1) Case of Normal Sector S

Figure 11A:
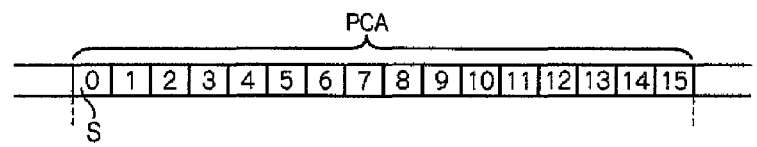
FIG. 11A is a schematic diagram illustrating a test writing area at the time of describing a level system.

FIG. 11A illustrates the test writing area PCA divided by a sector S.

Figure 11B:
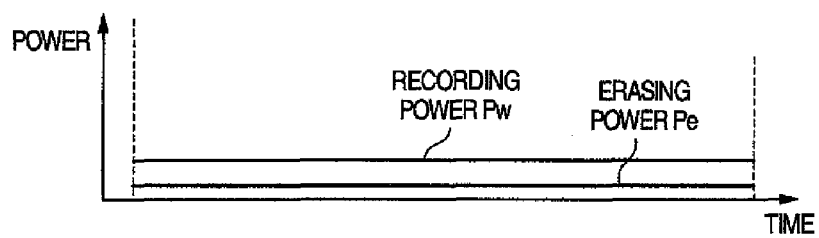
FIG. 11B is a schematic diagram for performing an erasing process in constant low power at the time of describing a level system.

In a graph of FIG. 11B, illustrated is a state of the erasing power Pe and the recording power Pw in which the CPU records the recording power Pw onto the test writing area PCA in constant low power in step S22. In the present embodiment, since a ratio between the recording power Pw and the erasing power Pe is fixed, when the recording power Pw is calculated, the erasing power Pe of constant low power is calculated.

Figure 11C:
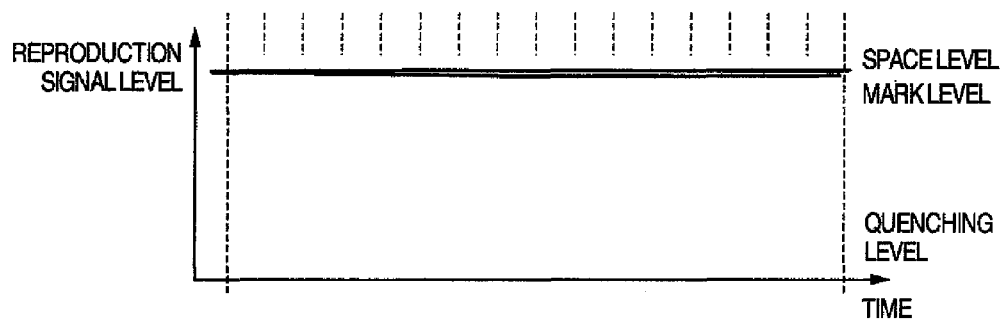
FIG. 11C is a schematic diagram illustrating a reproduction signal at the time of describing a level system.

In a graph of FIG. 11C, illustrated is the reproduction signal that is obtained for each sector S by the CPU in step S23. The vertical axis represents the level value of the reproduction signal, and the horizontal axis represents the recording power Pw. Since the recording operation is performed onto the test writing area PCA in constant low power after the erasing operation, this substantially eliminates a difference between the space level and the mark level under normal conditions, and the mark level becomes constant with its value approximating to the space level.

Figure 11D:
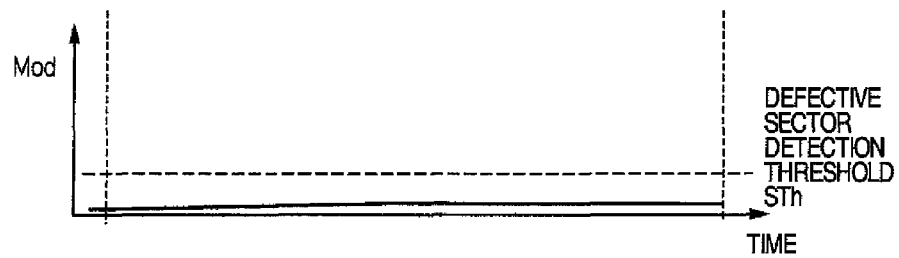
FIG. 11D is a schematic diagram illustrating a modulation depth process at the time of describing a level system.
Figure 11E:
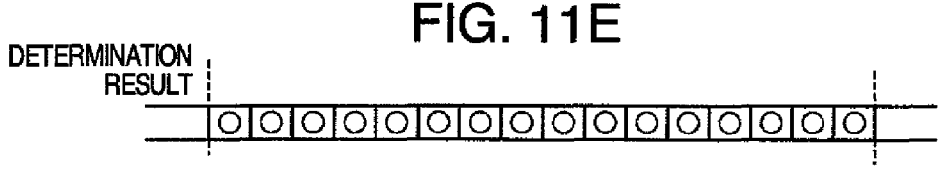
FIG. 11E is a schematic diagram illustrating a determination result at the time of describing a level system.

In a graph of FIG. 11D, illustrated is a modulation depth that is obtained from this reproduction signal. The vertical axis represents the modulation depth, and the horizontal axis represents the recording power Pw. A straight line of FIG. 11D shows the modulation depth obtained in each sector S. When a difference between the space level and the mark level is substantially eliminated, the modulation depth is plotted with a low value. Accordingly, when all of the modulation depths have values lower than the threshold STh for detecting a defective sector, it is shown that no defective sector exists as in the determination result shown in FIG. 11E.

Figure 11F:
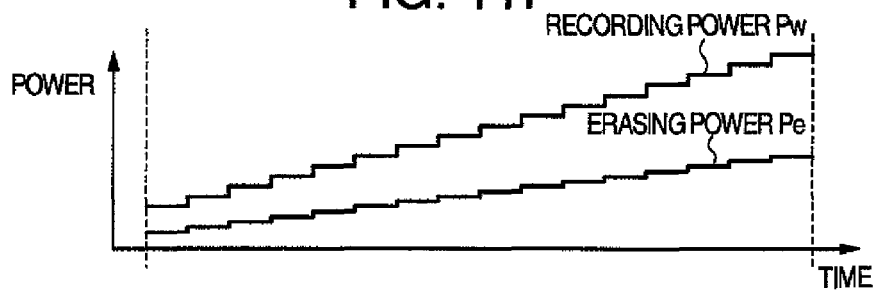
FIG. 11F is a schematic diagram illustrating a recording process at the time of describing a level system.
Figure 11G:
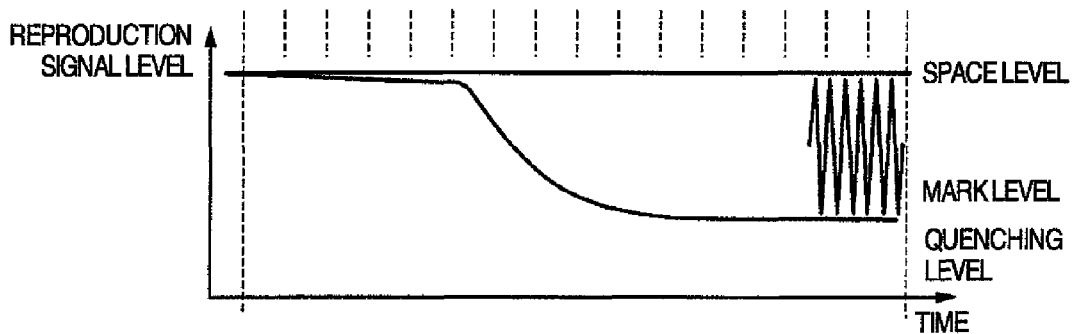
FIG. 11G is a schematic diagram illustrating a reproduction signal at the time of describing a level system.
Figure 11H:
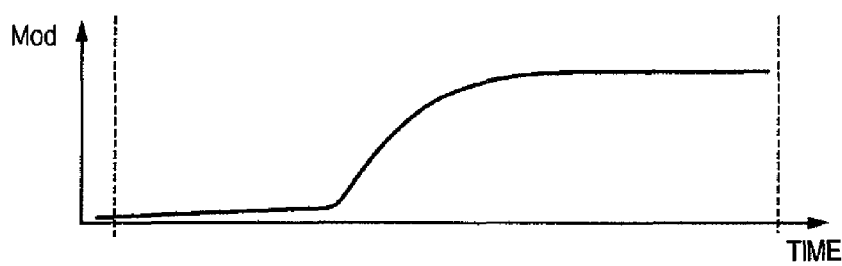
FIG. 11H is a schematic diagram illustrating a modulation depth process at the time of describing a level system.
Figure 11I:
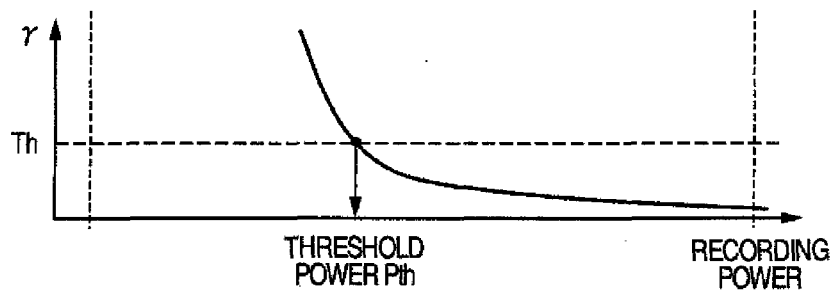
FIG. 11I is a schematic diagram illustrating a value γ at the time of describing a level system.

As shown in FIG. 11F, the CPU stepwise changes the recording power Pw for each sector S. Further, since a ratio between the recording power Pw and the erasing power Pe is fixed, the CPU records the erasing power Pe while stepwise changing also the erasing power Pe for each sector S at the same time as the recording power Pw (step S27). As shown in FIG. 11G, the CPU obtains the reproduction signal, and obtains the modulation depth based on the obtained reproduction signal as shown in FIG. 11H (step S28). Finally, as shown in FIG. 11I, when calculating the value γ from the modulation depth for the recording power Pw, the CPU confirms that the front and rear γ values interposing the γ threshold Th are not γ values held by the defective sector S (step S29), and calculates the threshold power Pth (step S30).

(3-1-2) Case where Defective Sectors S Not Less than 8 Sectors S Exist

Figure 12A:
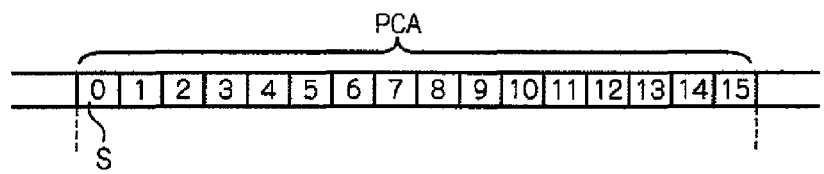
FIG. 12A is a schematic diagram illustrating a test writing area at the time of describing a level system.

FIG. 12A illustrates the test writing area PCA divided by a sector S.

Figure 12B:
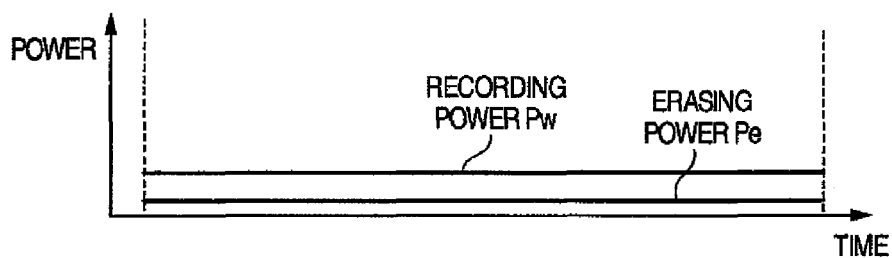
FIG. 12B is a schematic diagram for performing an erasing process in constant low power at the time of describing a level system.

In a graph of FIG. 12B, illustrated is a state of the erasing power Pe and the recording power Pw in which the CPU records the recording power Pw onto the test writing area PCA in constant low power in step S22.

Figure 12C:
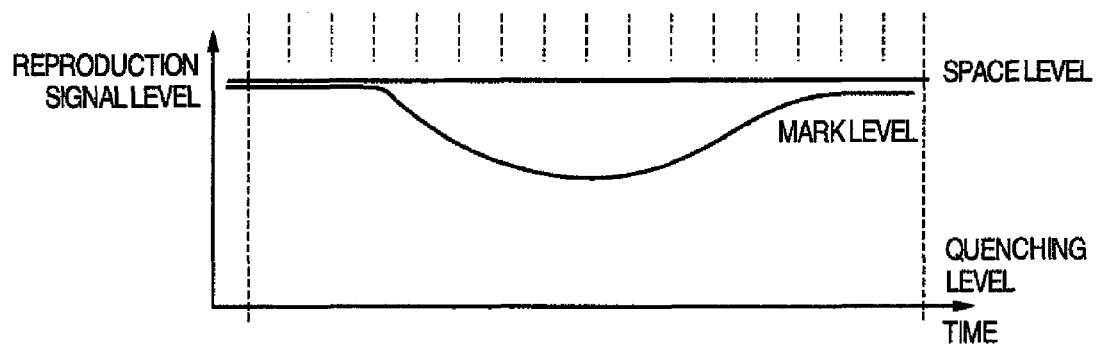
FIG. 12C is a schematic diagram illustrating a reproduction signal at the time of describing a level system.

In a graph of FIG. 12C, illustrated is the reproduction signal that is obtained for each sector S by the CPU in step S23. The vertical axis represents the level value of the reproduction signal, and the horizontal axis represents the recording power Pw. Since the recording operation is performed onto the test writing area PCA in constant low power after the erasing operation, this substantially eliminates a difference between the space level and the mark level under normal conditions, and the mark level becomes constant with its value more approximating to the space level. However, differences between the mark level and the space level exist in some cases.

Figure 12D:
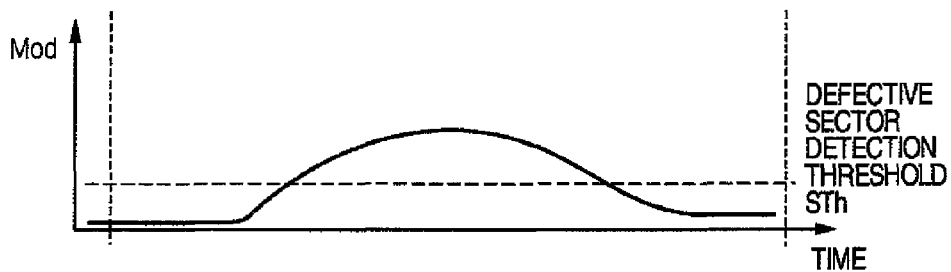
FIG. 12D is a schematic diagram illustrating a modulation depth process at the time of describing a level system.
Figure 12E:
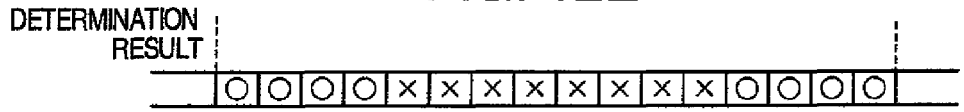
FIG. 12E is a schematic diagram illustrating a determination result at the time of describing a level system.

In a graph of FIG. 12D, illustrated is a modulation depth obtained from this reproduction signal. The vertical axis represents the modulation depth, and the horizontal axis represents the recording power Pw. A straight line of FIG. 12D shows the modulation depth obtained by each sector S. When a difference between the mark level and the space level exists, the modulation depth is plotted with its value being higher than the threshold STh for detecting a defective sector. Accordingly, some sectors in which the modulation depth has a value higher than the threshold STh for detecting a defective sector are determined to be defective sectors as in the determination result shown in FIG. 12E. In addition, in this example, 9 sectors exist as the defective sector and its number is the number of sectors not less than 8 sectors as the threshold sector; therefore, the CPU determines that this test writing area PCA is not used (step S25: YES).

As described above, also in the level system, defective sectors are detected and the threshold power Pth is detected except for the detected defective sectors; therefore, the optimum recording power Pw can be calculated. Further, also when defective sectors S less than 8 sectors S exist, an influence from the defective sectors is eliminated and the optimum recording power Pw can be stably calculated from the threshold power Pth in the same manner as in the mark counting method.

(3-2) Jitter Method

The jitter method is a method in which the recording power Pw is measured and evaluated using as an index a length of the recording mark recorded by the mark length recording method or a length of a space between the recording marks.

Specifically, the threshold power Pth is detected using a difference between the reference length and a length of the recording mark obtained by the binarization. A data-to-data jitter method is a method in which detected is whether or not the recording mark to be recorded is recorded with an appropriate length in an appropriate position. When the reference length is set to 6 T, the amount of deviation as to how long an edge of the recording mark is deviated from the reference length is shown by jitter. That is, when a value of the jitter is high, it is shown that an edge of the recording mark is largely deviated from the reference length. In the present embodiment, the reference length is set to 6 T.

Figure 13A:
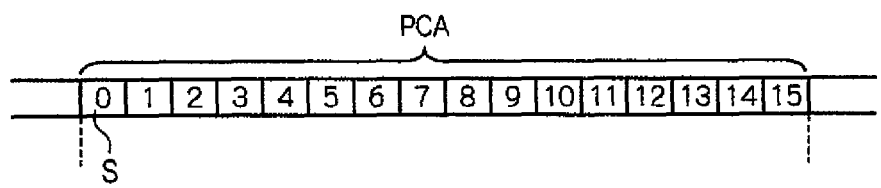
FIG. 13A is a schematic diagram illustrating a test writing area at the time of describing a jitter method.
Figure 13B:
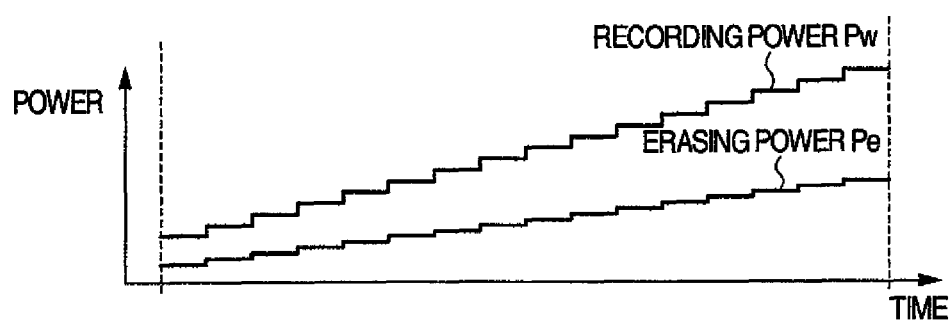
FIG. 13B is a schematic diagram illustrating a recording process at the time of describing a jitter method.
Figure 13C:
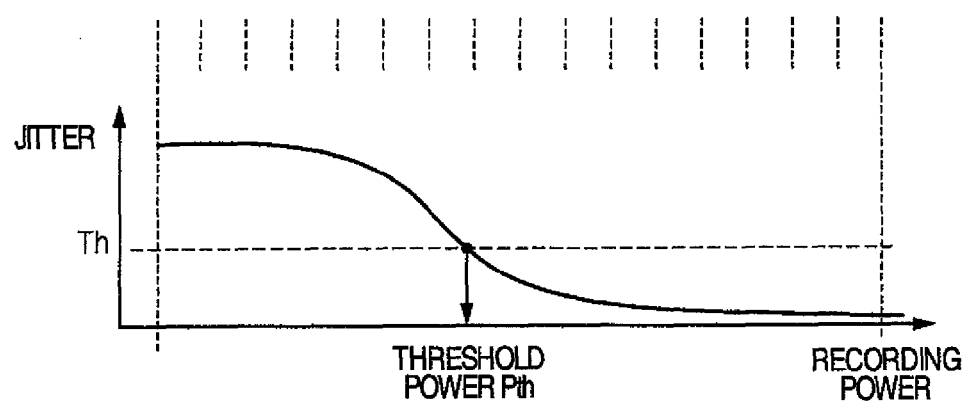
FIG. 13C is a schematic diagram illustrating jitter at the time of describing a jitter method.

In the recording process shown in FIG. 13B, when the recording power Pw is stepwise changed in each sector S shown in FIG. 13A, the jitter as shown in FIG. 13C can be obtained in each sector. An intersection point of the threshold Th of the jitter and the waveform is detected as the threshold power Pth.

Next, a case where a detection method of the defective sector is applied to the jitter method will be described.

(3-2-1) Case of Normal Sector S

Figure 14A:
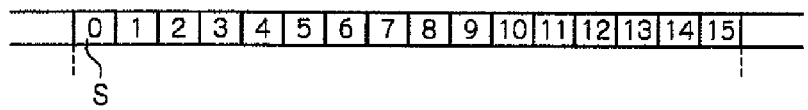
FIG. 14A is a schematic diagram illustrating a test writing area at the time of describing a jitter method.

FIG. 14A illustrates the test writing area PCA divided by a sector S.

Figure 14B:
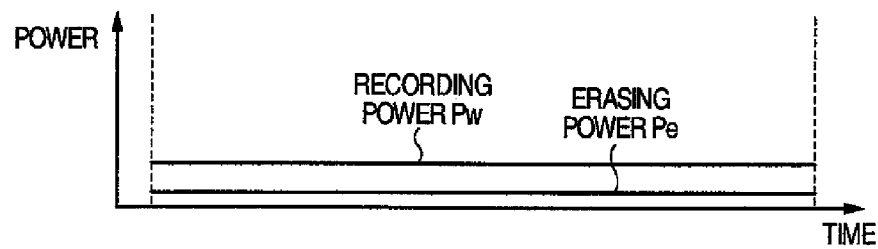
FIG. 14B is a schematic diagram for performing an erasing process in constant low power at the time of describing a jitter method.

In a graph of FIG. 14B, illustrated is a state of the erasing power Pe and the recording power Pw in which the CPU records the recording power Pw onto the test writing area PCA in constant low power in step S22. In the present embodiment, since a ratio between the recording power Pw and the erasing power Pe is fixed, when the recording power Pw is calculated, the erasing power Pe of constant low power is calculated.

Figure 14C:
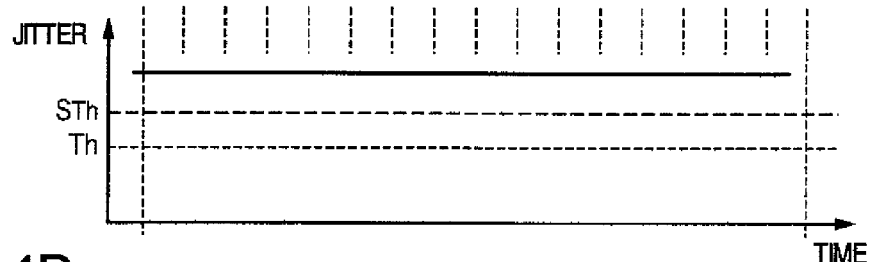
FIG. 14C is a schematic diagram illustrating jitter at the time of describing a jitter method.
Figure 14D:
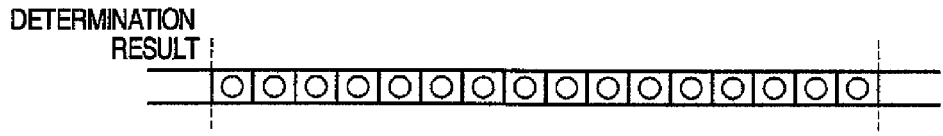
FIG. 14D is a schematic diagram illustrating a determination result at the time of describing a jitter method.

In a graph of FIG. 14C, illustrated is the jitter that is obtained for each sector S by the CPU in step S23. The vertical axis represents the jitter, and the horizontal axis represents the recording power Pw. A straight line of FIG. 14C shows the jitter obtained in each sector S. In step S23, after erasing once the recording mark that is recorded onto the test writing area PCA, the CPU freshly records the recording mark in low power; therefore, a recording mark length that is recorded in low power is shorter than the reference length. Therefore, since the recording mark length recorded in low power is largely deviated from the reference length, the jitter has a high value. As in the determination result shown in FIG. 14D, when all the jitter values are higher than the threshold STh for detecting a defective sector, it is shown that no defective sector exists.

Figure 14E:
FIG. 14E is a schematic diagram illustrating a recording process at the time of describing a jitter method.
Figure 14F:
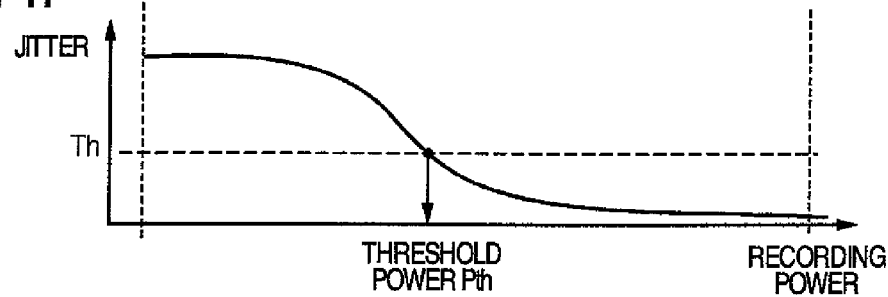
FIG. 14F is a schematic diagram illustrating jitter at the time of describing a jitter method.

As shown in FIG. 14E, the CPU stepwise changes the recording power Pw for each sector S. Further, since a ratio between the recording power Pw and the erasing power Pe is fixed, the CPU performs the recording operation while changing also the erasing power Pe for each sector S at the same time as the recording power Pw (step S27). As shown in FIG. 14F, the CPU obtains the jitter (step S28). Thereafter, the CPU confirms that the front and rear jitters interposing the jitter threshold Th are not the jitters that are held by the defective sectors S (step S29), and calculates the threshold power Pth (step S30).

(3-2-2) Case where Defective Sectors S Not Less than 8 Sectors S Exist

Figure 15A:
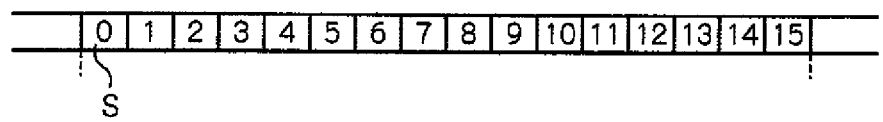
FIG. 15A is a schematic diagram illustrating a test writing area at the time of describing a jitter method.

FIG. 15A illustrates the test writing area PCA divided by a sector S.

Figure 15B:
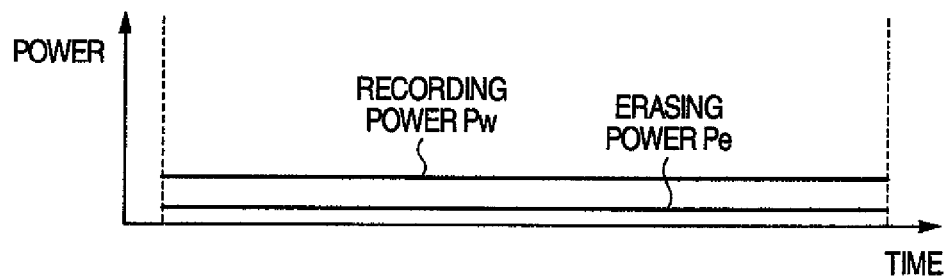
FIG. 15B is a schematic diagram for performing an erasing process in constant low power at the time of describing a jitter method.

In a graph of FIG. 15B, illustrated is a state of the erasing power Pe and the recording power Pw in which the CPU records the recording power Pw onto the test writing area PCA in constant low power in step S22.

Figure 15C:
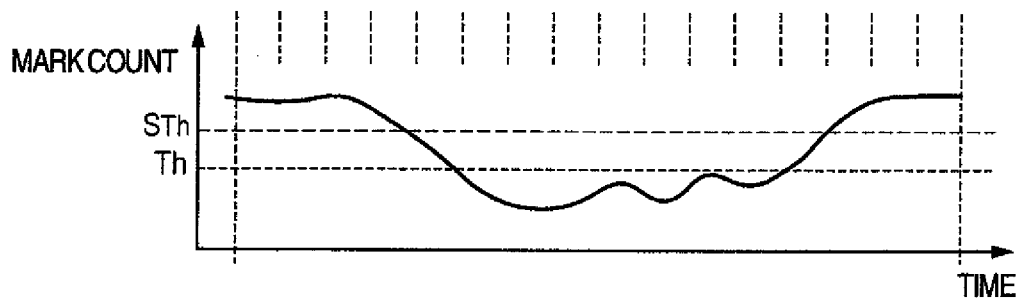
FIG. 15C is a schematic diagram illustrating jitter at the time of describing a jitter method.
Figure 15D:
FIG. 15D is a schematic diagram illustrating a determination result at the time of describing a jitter method.

In a graph of FIG. 15C, illustrated is the jitter that is obtained for each sector S by the CPU in step S23. The vertical axis represents the jitter, and the horizontal axis represents the recording power Pw. A curved line of FIG. 15C shows the jitter obtained in each sector S. Under normal circumstances, since the recording mark length recorded in low power is largely deviated from the reference length, the jitter has a high numeral value. However, the jitter is recorded onto the test writing area PCA, in some cases, with its value being lower than the threshold for detecting a defective sector S. As in the determination result shown in FIG. 15D, the sectors S that hold the jitter lower than the threshold for detecting the defective sector S are determined to be defective sectors S (areas). In addition, in this example, 9 sectors exist as the defective sector S and its number is the number of sectors not less than 8 sectors as the threshold sector number; therefore, the CPU determines that this test writing area PCA is not used (step S25: YES).

As described above, also in the jitter system, defective sectors are detected and the threshold power Pth is detected except for the detected defective sectors; therefore, the optimum recording power Pw can be calculated. Further, also when defective sectors S less than 8 sectors S exist, an influence from the defective sectors is eliminated and the optimum recording power Pw can be stably calculated from the threshold power Pth in the same manner as in the mark count system.

As described above, the reason that the CPU does not perform the recording operation onto the test writing area PCA by irradiation of constant high power in each method is that: (1) there is the possibility that since an appropriate recording power is not calculated, when the recording power beyond the allowable limit of the recording layer is used, the recording layer itself is broken, and (2) the mark level is wholly lowered due to the irradiation of high power; however, it is difficult that set is a level difference for clearly determine a deteriorated area or a recording mark that is left behind. When the CPU records the recording mark onto the test writing area PCA using the recording power of constant low power, a level difference of a clearer reproduction signal can be obtained. Further, the defective sector in the test writing area can be determined at the same time, and usable areas can be extracted.

(6) Effect of the Present Embodiment

According to the present embodiment, an area in which characteristics corresponding to the recording power are not obtained due to a recording mark that is left behind is excluded to adjust the recording power in the test writing process onto a rewritable optical disk. Thereby, the test writing process having high stability and high accuracy can be realized.

(7) Another Embodiment

In the aforementioned embodiment, the recording mark length as the reference length is set to 6 T. However, according to another embodiment, the recording mark length as the reference length may be set to a length except a length of 6 T, or also a combination of a plurality of lengths, for example, a combination of lengths of 6 T and 7 T.

A recording power obtained by multiplying the threshold power Pth by a predetermined value is used as the recording power; as the predetermined value, there may be used a value that is held by the microcomputer control circuit based on the type of the optical disk or information previously embedded in the optical disk.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for adjusting recording power of an optical disk apparatus having an output circuit configured to output recording light onto a test writing area of an optical disk, and a control circuit configured to adjust the recording power of the recording light outputted from the output circuit onto a test writing area of an optical disk, the method including the following steps executed by the control circuit:
   erasing a recording mark recorded onto the test writing area;
   recording a recording mark onto the test writing area in constant recording power lower than a threshold power for starting a recording operation; and
   after the step of recording the recording mark onto the test writing area in constant recording power lower than a threshold power for starting a recording operation, recording a recording mark onto the test writing area while changing the recording power.

2. The method according to claim 1, further comprising the step of causing the control circuit to determine in each sector whether or not the recording power is to be adjusted using the recording mark recorded onto the test writing area divided by a plurality of sectors in constant recording power lower than the threshold power.

3. The method according to claim 2, further comprising the step of causing the control circuit to exclude the test writing area from an area of the recording power to be adjusted when defective sectors not less than the number of thresholds exist.

4. The method according to claim 2, further comprising the step of causing the control circuit to exclude the defective sectors to adjust the recording power when defective sectors less than the number of thresholds exist.

5. The method according to claim 2, further comprising the steps of:
causing the control circuit to compare a length of the recording mark recorded in constant recording power lower than the threshold power with a reference length having set therein a predetermined recording mark length; and
determining that sectors having recorded thereon the recording mark are excluded from the adjustment of the recording power when each recording mark length obtained in each sector is deviated from the reference length, or the number of the recording marks detected not as the reference length but as the recording mark length is not more than the predetermined number of the thresholds.

6. The method according to claim 1, wherein:
the threshold power is any one of threshold power calculated from a setting value described in the optical disk, threshold power calculated from a ratio between a value of the recording power described in the optical disk and a value of the threshold power described in the recording power and the optical disk, and threshold power in which data clock jitter showing the deviation amount of an edge of the recording mark is 13%.

7. An optical disk apparatus comprising:
an output circuit configured to output recording light onto a test writing area of an optical disk; and
a control circuit configured to adjust recording power of the recording light outputted from the output circuit, wherein:
the control circuit is configured to control the recording power so as to:
erase a recording mark recorded onto the test writing area,
record a recording mark onto the test writing area in a constant recording power lower than a threshold power for starting a recording operation, and
after recording the recording mark onto the test writing area in a constant recording power lower than a threshold power for starting a recording operation, recording the recording mark onto the test writing area while changing the recording power.

8. The optical disk apparatus according to claim 7, wherein:
the control circuit is configured to determine in each sector whether or not the recording power is to be adjusted, by using the recording mark that is recorded onto the test writing area divided by a plurality of sectors in constant recording power lower than the threshold power.

9. The optical disk apparatus according to claim 8, wherein:
when defective sectors not less than the number of thresholds exist, the control circuit is configured to perform a control operation so as to exclude the test writing area used in the recording process from an area of the recording power to be adjusted.

10. The optical disk apparatus according to claim 8, wherein:
when defective sectors less than the number of thresholds exist, the control circuit is configured to perform a control operation so as to exclude the defective sectors to adjust the recording power.

11. The optical disk apparatus according to claim 8, wherein the control circuit is configured to:
compare a length of the recording mark recorded in constant recording power lower than the threshold power with a reference length having set therein a predetermined recording mark length; and
determine that sectors having recorded thereon the recording mark are excluded from the adjustment of the recording power when each recording mark length obtained in each sector is deviated from the reference length, or the number of the recording marks detected not as the reference length but as the recording mark length is not more than the predetermined number of the thresholds.

12. The optical disk apparatus according to claim 7, wherein:
the threshold power is any one of: a threshold power calculated from a setting value described in the optical disk, a threshold power calculated from a ratio between a value of the recording power described in the optical disk and a value of the threshold power described in the recording power and the optical disk, and a threshold power in which data clock jitter showing the deviation amount of an edge of the recording mark is 13%.

13. The method according to claim 1, further comprising the step of erasing the recording mark recorded onto the test writing area in constant recording power lower than a threshold power for starting a recording operation, after the step of recording a recording mark onto the test writing area in constant recording power lower than a threshold power for starting a recording operation, but before the step of recording a recording mark onto the test writing area while changing the recording power.

14. The optical disk apparatus according to claim 7, wherein said control circuit is configured to erase the recording mark recorded onto the test writing area in constant recording power lower than a threshold power for starting a recording operation, after the recording mark has been recorded onto the test writing area in constant recording power lower than a threshold power for starting a recording operation, but before the recording mark is recorded onto the test writing area while changing the recording power.

15. An optical disk apparatus comprising:
an output circuit configured to output recording light onto a test writing area of an optical disk; and
a control circuit configured to adjust the recording power of the recording light used for recording on a user data area,
wherein said control circuit is configured to execute the following processes:
an erasing process to an area of the test writing area on which the test writing is going to be made while changing the recording power,
a recording process of recording a recording mark onto the same area of the test writing area as that of the erasing process, in a constant recording power lower than a predetermined power, followed by a test writing process onto the same area of the test writing area as that of the recording mark created by the recorded process, while changing the recording power.

16. The optical disk apparatus according to claim 15, said control circuit being further configured to execute an erasing process of the recording mark recorded onto the area of the erasing process in a constant recording power lower than a predetermined power, after executing the recording process of recording a recording mark onto the area of the erasing process in a constant recording power lower than a predetermined power, but before executing the test writing process.

17. The optical disk apparatus according to claim 16, wherein if there is a defective area in the area of the erasing process in constant recording power lower than a predetermined power, said control circuit is configured to control the recording power of the recording light in the test writing process so as to execute the test writing process onto the recording mark recorded area other than the defective area, while changing the recording power.

18. A method for adjusting recording power of an optical disk apparatus having an output circuit configured to output recording light onto a test writing area of an optical disk, and a control circuit configured to adjust the recording power of the recording light outputted from the output circuit and used for recording on a user data area, the method including the following steps executed by the control circuit:

erasing an area of the test writing area on which the test writing is going to be made while changing the recording power, recording a recording mark onto the same area of the test writing area as that of the erasing, in a constant recording power lower than a predetermined power, followed by test writing onto the same area of the test writing area as that of the recording mark created by the recording, while changing the recording power.

19. The optical disk apparatus according to claim 15, the method further including the following steps executed by the control circuit:

erasing the recording mark recorded onto the area of the erasing process in a constant recording power lower than a predetermined power, after recording a recording mark onto the area of the erasing process in a constant recording power lower than a predetermined power, but before test writing.

20. The optical disk apparatus according to claim 16, wherein if there is a defective area in the area of the erasing process in constant recording power lower than a predetermined power, said control circuit controls the recording power of the recording light in the test writing process so as to execute the test writing process onto the recording mark recorded area other than the defective area, while changing the recording power.

* * * * *